US008072422B2

(12) United States Patent
Rosenberg et al.

(10) Patent No.: US 8,072,422 B2
(45) Date of Patent: Dec. 6, 2011

(54) NETWORKED APPLICATIONS INCLUDING HAPTIC FEEDBACK

(75) Inventors: Louis B. Rosenberg, San Jose, CA (US); Scott B. Brave, Edwards, CO (US); Sian W. Tan, Mountain View, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 12/638,263

(22) Filed: Dec. 15, 2009

(65) Prior Publication Data

US 2010/0148943 A1    Jun. 17, 2010

Related U.S. Application Data

(63) Continuation of application No. 10/615,927, filed on Jul. 10, 2003, now Pat. No. 7,636,080, which is a continuation of application No. 09/153,781, filed on Sep. 16, 1998, which is a continuation-in-part of application No. 09/050,665, filed on Mar. 30, 1998, now Pat. No. 6,219,033, which is a continuation of application No. 08/691,852, filed on Aug. 1, 1996, now Pat. No. 5,956,484, which is a continuation of application No. 08/664,086, filed on Jun. 14, 1996, now Pat. No. 6,028,593, which is a continuation of application No. 08/571,606, filed on Dec. 13, 1995, now Pat. No. 6,219,032, which is a continuation of application No. 08/566,282, filed on Dec. 1, 1995, now Pat. No. 5,734,373, said application No. 08/664,086.

(60) Provisional application No. 60/017,803, filed on May 17, 1996.

(51) Int. Cl.
*G09F 5/00* (2006.01)

(52) U.S. Cl. ........................................ 345/156; 715/701

(58) Field of Classification Search .......... 345/156–158, 345/161; 273/148 B; 463/30–32, 36–42; 715/701, 702; 709/203, 217, 227, 250
See application file for complete search history.

(56) References Cited

U.S. PATENT DOCUMENTS
2,906,179 A    9/1959    Bower
(Continued)

FOREIGN PATENT DOCUMENTS
EP    0085518 A1    8/1983
(Continued)

OTHER PUBLICATIONS

United States Patent and Trademark Office, Office Action, U.S. Appl. No. 09/153,781, mailed Dec. 8, 2008.
(Continued)

*Primary Examiner* — Regina Liang
(74) *Attorney, Agent, or Firm* — Kilpatrick Townsend & Stockton LLP

(57) ABSTRACT

Method and apparatus for providing peer-to-peer force feedback over a computer network. A network force feedback system includes a network, a first computer coupled to the network, and a second computer coupled to the network. The first and second computers each include a visual display and a force feedback interface device. Each computer provides a force feedback signal to its force feedback device based on information received from the other, remote computer and in some cases also based on input from the local force feedback device. Positional information of each force feedback device and/or feel sensation information can be transmitted between the computers over the network. A graphical environment can be displayed to enhance the interaction between users. The present invention therefore permits two computer users to interact using force feedback provided over a network on a peer-to-peer basis.

17 Claims, 13 Drawing Sheets

U.S. PATENT DOCUMENTS

| | | |
|---|---|---|
| 2,972,140 A | 2/1961 | Hrisch |
| 3,157,853 A | 11/1964 | Hirsch |
| 3,220,121 A | 11/1965 | Cutler |
| 3,446,322 A | 5/1969 | Wrensch |
| 3,490,059 A | 1/1970 | Paulsen et al. |
| 3,497,668 A | 2/1970 | Hirsch |
| 3,517,446 A | 6/1970 | Corlyon et al. |
| 3,531,868 A | 10/1970 | Stevenson |
| 3,623,064 A | 11/1971 | Kagan |
| 3,795,150 A | 3/1974 | Eckhardt |
| 3,875,488 A | 4/1975 | Crocker et al. |
| 3,890,958 A | 6/1975 | Fister et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,923,166 A | 12/1975 | Fletcher et al. |
| 3,944,798 A | 3/1976 | Eaton |
| 4,114,882 A | 9/1978 | Mau |
| 4,125,800 A | 11/1978 | Jones |
| 4,127,752 A | 11/1978 | Lowthorp |
| 4,131,033 A | 12/1978 | Wright et al. |
| 4,148,014 A | 4/1979 | Burson |
| 4,160,508 A | 7/1979 | Salsbury |
| 4,216,467 A | 8/1980 | Colston |
| 4,236,325 A | 12/1980 | Hall et al. |
| 4,262,549 A | 4/1981 | Schwellenbach |
| 4,333,070 A | 6/1982 | Barnes |
| 4,398,889 A | 8/1983 | Lam et al. |
| 4,448,083 A | 5/1984 | Hayashi |
| 4,464,117 A | 8/1984 | Foerst |
| 4,477,043 A | 10/1984 | Repperger |
| 4,477,973 A | 10/1984 | Davies |
| 4,484,191 A | 11/1984 | Vavra |
| 4,513,235 A | 4/1985 | Acklam et al. |
| 4,550,221 A | 10/1985 | Mabusth |
| 4,550,617 A | 11/1985 | Fraignier et al. |
| 4,560,983 A | 12/1985 | Williams |
| 4,571,834 A | 2/1986 | Fraser et al. |
| 4,581,491 A | 4/1986 | Boothroyd |
| 4,593,470 A | 6/1986 | Davies |
| 4,599,070 A | 7/1986 | Hladky et al. |
| 4,601,206 A | 7/1986 | Watson |
| 4,603,284 A | 7/1986 | Perzley |
| 4,604,016 A | 8/1986 | Joyce |
| 4,632,341 A | 12/1986 | Repperger et al. |
| 4,638,798 A | 1/1987 | Sheldon et al. |
| 4,653,011 A | 3/1987 | Iwano |
| 4,654,648 A | 3/1987 | Herrington et al. |
| 4,676,002 A | 6/1987 | Slocum |
| 4,679,331 A | 7/1987 | Koontz |
| 4,686,397 A | 8/1987 | Becker |
| 4,688,983 A | 8/1987 | Lindbom |
| 4,689,449 A | 8/1987 | Rosen |
| 4,692,756 A | 9/1987 | Clark |
| 4,703,443 A | 10/1987 | Moriyasu |
| 4,704,909 A | 11/1987 | Grahn et al. |
| 4,706,294 A | 11/1987 | Ouchida |
| 4,708,656 A | 11/1987 | De Vries et al. |
| 4,713,007 A | 12/1987 | Alban |
| 4,734,685 A | 3/1988 | Watanabe |
| 4,750,487 A | 6/1988 | Zanetti |
| 4,769,763 A | 9/1988 | Trieb et al. |
| 4,782,327 A | 11/1988 | Kley et al. |
| 4,787,051 A | 11/1988 | Olson |
| 4,791,934 A | 12/1988 | Brunnett |
| 4,794,392 A | 12/1988 | Selinko |
| 4,795,296 A | 1/1989 | Jau |
| 4,795,929 A | 1/1989 | Elgass et al. |
| 4,798,919 A | 1/1989 | Miessler et al. |
| 4,800,721 A | 1/1989 | Cemenska et al. |
| 4,803,413 A | 2/1989 | Kendig et al. |
| 4,811,608 A | 3/1989 | Hilton |
| 4,819,195 A | 4/1989 | Bell et al. |
| 4,823,634 A | 4/1989 | Culver |
| 4,839,838 A | 6/1989 | LaBiche et al. |
| 4,849,692 A | 7/1989 | Blood |
| 4,853,874 A | 8/1989 | Iwamoto et al. |
| 4,868,549 A | 9/1989 | Affinito et al. |
| 4,879,556 A | 11/1989 | Duimel |
| 4,885,565 A | 12/1989 | Embach |
| 4,888,538 A | 12/1989 | Dimitov et al. |
| 4,888,877 A | 12/1989 | Enderle et al. |
| 4,891,764 A | 1/1990 | McIntosh |
| 4,891,889 A | 1/1990 | Tomelleri |
| 4,896,554 A | 1/1990 | Culver |
| 4,907,970 A | 3/1990 | Meenen, Jr. |
| 4,907,973 A | 3/1990 | Hon |
| 4,925,312 A | 5/1990 | Onaga et al. |
| 4,930,770 A | 6/1990 | Baker |
| 4,934,694 A | 6/1990 | McIntosh |
| 4,935,728 A | 6/1990 | Kley |
| 4,942,538 A | 7/1990 | Yuan et al. |
| 4,942,545 A | 7/1990 | Sapia |
| 4,945,305 A | 7/1990 | Blood |
| 4,945,501 A | 7/1990 | Bell et al. |
| 4,949,119 A | 8/1990 | Moncrief et al. |
| 4,961,038 A | 10/1990 | MacMinn |
| 4,961,138 A | 10/1990 | Gorniak |
| 4,961,267 A | 10/1990 | Herzog |
| 4,962,448 A | 10/1990 | DeMaio et al. |
| 4,962,591 A | 10/1990 | Zeller et al. |
| 4,982,504 A | 1/1991 | Soderberg et al. |
| 4,982,618 A | 1/1991 | Culver |
| 4,983,786 A | 1/1991 | Stevens et al. |
| 4,983,901 A | 1/1991 | Lehmer |
| 5,007,085 A | 4/1991 | Greanias et al. |
| 5,007,300 A | 4/1991 | Siva |
| 5,018,922 A | 5/1991 | Yoshinada et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,040,306 A | 8/1991 | McMurtry et al. |
| 5,044,956 A | 9/1991 | Behensky et al. |
| 5,050,608 A | 9/1991 | Watanabe et al. |
| 5,065,145 A | 11/1991 | Purcell |
| 5,072,361 A | 12/1991 | Davis et al. |
| 5,076,517 A | 12/1991 | Ferranti et al. |
| 5,078,152 A | 1/1992 | Bond |
| 5,080,377 A | 1/1992 | Stamper et al. |
| 5,088,046 A | 2/1992 | McMurtry et al. |
| 5,088,055 A | 2/1992 | Oyama |
| 5,095,303 A | 3/1992 | Clark et al. |
| 5,103,404 A | 4/1992 | McIntosh |
| 5,107,080 A | 4/1992 | Rosen |
| 5,107,262 A | 4/1992 | Cadoz et al. |
| 5,116,051 A | 5/1992 | Moncrief et al. |
| 5,116,180 A | 5/1992 | Fung et al. |
| 5,126,948 A | 6/1992 | Mitchell et al. |
| 5,128,671 A | 7/1992 | Thomas, Jr. |
| 5,131,844 A | 7/1992 | Marinaccio et al. |
| 5,132,672 A | 7/1992 | Clark |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,146,566 A | 9/1992 | Hollis, Jr. et al. |
| 5,148,377 A | 9/1992 | McDonald |
| 5,165,897 A | 11/1992 | Johnson |
| 5,175,459 A | 12/1992 | Daniel et al. |
| 5,178,012 A | 1/1993 | Culp |
| 5,181,181 A | 1/1993 | Glynn |
| 5,182,557 A | 1/1993 | Lang |
| 5,184,306 A | 2/1993 | Edrman et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,187,874 A | 2/1993 | Takahashi et al. |
| 5,189,355 A | 2/1993 | Larkins et al. |
| 5,189,806 A | 3/1993 | McMurtry et al. |
| 5,193,963 A | 3/1993 | McAffee et al. |
| 5,195,179 A | 3/1993 | Tokunaga |
| 5,197,003 A | 3/1993 | Moncrief et al. |
| 5,203,563 A | 4/1993 | Loper, III |

| | | | | | |
|---|---|---|---|---|---|
| 5,204,824 A | 4/1993 | Fujimaki | 5,586,257 A | 12/1996 | Perlman |
| 5,209,131 A | 5/1993 | Baxter | 5,587,937 A | 12/1996 | Massie et al. |
| 5,212,473 A | 5/1993 | Louis | 5,589,828 A | 12/1996 | Armstrong |
| 5,220,260 A | 6/1993 | Schuler | 5,589,854 A | 12/1996 | Tsai |
| 5,223,776 A | 6/1993 | Radke et al. | 5,591,924 A | 1/1997 | Hilton |
| 5,228,356 A | 7/1993 | Chuang | 5,596,347 A | 1/1997 | Robertson et al. |
| 5,230,623 A | 7/1993 | Guthrie et al. | 5,619,180 A | 4/1997 | Massimino et al. |
| 5,235,868 A | 8/1993 | Culver | 5,623,582 A | 4/1997 | Rosenberg |
| 5,240,417 A | 8/1993 | Smithson et al. | 5,623,642 A | 4/1997 | Katz et al. |
| 5,243,266 A | 9/1993 | Kasagami et al. | 5,625,576 A | 4/1997 | Massie et al. |
| 5,251,127 A | 10/1993 | Raab | 5,629,594 A | 5/1997 | Jacobus et al. |
| 5,251,156 A | 10/1993 | Heier et al. | 5,629,597 A | 5/1997 | Imanaka |
| 5,259,120 A | 11/1993 | Chapman et al. | 5,631,861 A | 5/1997 | Kramer |
| 5,259,894 A | 11/1993 | Sampson | 5,642,469 A | 6/1997 | Hannaford et al. |
| 5,262,777 A | 11/1993 | Low et al. | 5,643,087 A | 7/1997 | Marcus et al. |
| 5,264,768 A | 11/1993 | Gregory et al. | 5,656,901 A | 8/1997 | Kurita |
| 5,266,875 A | 11/1993 | Slotine et al. | 5,666,138 A | 9/1997 | Culver |
| 5,271,290 A | 12/1993 | Fischer | 5,666,473 A | 9/1997 | Wallace |
| 5,275,174 A | 1/1994 | Cook | 5,685,775 A | 11/1997 | Bakoglu et al. |
| 5,275,565 A | 1/1994 | Moncrief | 5,690,582 A | 11/1997 | Ulrich et al. |
| 5,283,970 A | 2/1994 | Aigner | 5,691,747 A | 11/1997 | Amano |
| 5,286,203 A | 2/1994 | Fuller et al. | 5,691,898 A | 11/1997 | Rosenberg et al. |
| 5,289,273 A | 2/1994 | Lang | 5,694,013 A | 12/1997 | Stewart et al. |
| 5,296,846 A | 3/1994 | Ledley | 5,695,400 A | 12/1997 | Fennell et al. |
| 5,296,871 A | 3/1994 | Paley | 5,701,140 A | 12/1997 | Rosenberg et al. |
| 5,298,890 A | 3/1994 | Kanamaru et al. | 5,709,219 A | 1/1998 | Chen et al. |
| 5,299,810 A | 4/1994 | Pierce | 5,714,978 A | 2/1998 | Yamanaka et al. |
| 5,309,140 A | 5/1994 | Everett | 5,721,566 A | 2/1998 | Rosenberg et al. |
| 5,313,230 A | 5/1994 | Venolia et al. | 5,724,068 A | 3/1998 | Sanchez et al. |
| 5,334,027 A | 8/1994 | Wherlock | 5,731,804 A | 3/1998 | Rosenberg |
| 5,341,459 A | 8/1994 | Backes | 5,734,373 A | 3/1998 | Rosenberg et al. |
| 5,351,692 A | 10/1994 | Dow et al. | 5,736,978 A | 4/1998 | Hasser et al. |
| 5,354,162 A | 10/1994 | Burdea et al. | 5,739,811 A | 4/1998 | Rosenberg et al. |
| 5,355,148 A | 10/1994 | Anderson | 5,742,278 A | 4/1998 | Chen et al. |
| 5,374,942 A | 12/1994 | Gilligan et al. | 5,745,715 A | 4/1998 | Pickover et al. |
| 5,379,663 A | 1/1995 | Hara | 5,754,023 A | 5/1998 | Roston et al. |
| 5,381,080 A | 1/1995 | Schnell et al. | 5,755,577 A | 5/1998 | Gillio |
| 5,384,460 A | 1/1995 | Tseng | 5,755,620 A | 5/1998 | Yamamoto et al. |
| 5,386,507 A | 1/1995 | Teig et al. | 5,757,358 A | 5/1998 | Osga |
| 5,389,865 A | 2/1995 | Jacobus et al. | 5,760,764 A | 6/1998 | Martinelli |
| 5,396,266 A | 3/1995 | Brimhall | 5,766,016 A | 6/1998 | Sinclair |
| 5,396,267 A | 3/1995 | Bouton | 5,767,839 A | 6/1998 | Rosenberg |
| 5,397,323 A | 3/1995 | Taylor et al. | 5,769,640 A | 6/1998 | Jacobus et al. |
| 5,402,582 A | 4/1995 | Raab | 5,771,037 A | 6/1998 | Jackson |
| 5,405,152 A | 4/1995 | Katanics et al. | 5,781,172 A | 7/1998 | Engel et al. |
| 5,412,880 A | 5/1995 | Raab | 5,784,052 A | 7/1998 | Keyson |
| 5,414,337 A | 5/1995 | Schuler | 5,785,630 A | 7/1998 | Bobick et al. |
| 5,417,696 A | 5/1995 | Kashuba et al. | 5,786,818 A | 7/1998 | Brewer et al. |
| 5,428,748 A | 6/1995 | Davidson et al. | 5,790,108 A | 8/1998 | Salcudean et al. |
| 5,429,140 A | 7/1995 | Burdea et al. | 5,791,992 A | 8/1998 | Crump et al. |
| 5,435,554 A | 7/1995 | Lipson | 5,802,353 A | 9/1998 | Avila et al. |
| 5,436,542 A | 7/1995 | Petelin et al. | 5,805,140 A | 9/1998 | Rosenberg et al. |
| 5,436,622 A | 7/1995 | Gutman et al. | 5,805,165 A | 9/1998 | Thorne, III et al. |
| 5,436,638 A | 7/1995 | Bolas et al. | 5,808,601 A | 9/1998 | Leah et al. |
| 5,436,640 A | 7/1995 | Reeves | 5,818,423 A | 10/1998 | Pugliese et al. |
| 5,437,607 A | 8/1995 | Taylor | 5,825,308 A | 10/1998 | Rosenberg |
| 5,445,166 A | 8/1995 | Taylor | 5,831,408 A | 11/1998 | Jacobus et al. |
| 5,451,924 A | 9/1995 | Massimino et al. | 5,844,392 A | 12/1998 | Peurach et al. |
| 5,459,382 A | 10/1995 | Jacobus et al. | 5,877,748 A | 3/1999 | Redlich |
| 5,466,213 A | 11/1995 | Hogan | 5,880,714 A | 3/1999 | Rosenberg et al. |
| 5,467,763 A | 11/1995 | McMahon et al. | 5,884,029 A | 3/1999 | Brush, II et al. |
| 5,471,571 A | 11/1995 | Smith et al. | 5,889,670 A | 3/1999 | Schuler et al. |
| 5,482,051 A | 1/1996 | Reddy et al. | 5,889,672 A | 3/1999 | Schuler et al. |
| 5,512,919 A | 4/1996 | Araki | 5,917,725 A | 6/1999 | Thacher et al. |
| 5,513,100 A | 4/1996 | Parker et al. | 5,956,484 A | 9/1999 | Rosenberg et al. |
| 5,526,480 A | 6/1996 | Gibson | 5,959,382 A | 9/1999 | Dauwalter |
| 5,530,455 A | 6/1996 | Gillick et al. | 5,990,869 A | 11/1999 | Kubica et al. |
| 5,547,382 A | 8/1996 | Yamasaki | 6,004,134 A | 12/1999 | Marcus et al. |
| 5,550,562 A | 8/1996 | Aoki et al. | 6,020,876 A | 2/2000 | Rosenberg et al. |
| 5,551,701 A | 9/1996 | Bouton et al. | 6,028,593 A | 2/2000 | Rosenberg et al. |
| 5,565,840 A | 10/1996 | Thorner et al. | 6,046,726 A | 4/2000 | Keyson |
| 5,565,887 A | 10/1996 | McCambridge et al. | 6,057,828 A | 5/2000 | Rosenberg et al. |
| 5,565,888 A | 10/1996 | Selker | 6,061,004 A | 5/2000 | Rosenberg |
| 5,570,111 A | 10/1996 | Barrett et al. | 6,078,308 A | 6/2000 | Rosenberg et al. |
| 5,575,761 A | 11/1996 | Hajianpour | 6,088,017 A | 7/2000 | Tremblay et al. |
| 5,576,727 A | 11/1996 | Rosenberg et al. | 6,088,019 A | 7/2000 | Rosenberg |
| 5,577,981 A | 11/1996 | Jarvik | 6,101,530 A | 8/2000 | Rosenberg et al. |
| 5,583,407 A | 12/1996 | Yamaguchi | 6,111,577 A | 8/2000 | Zilles et al. |
| 5,583,478 A | 12/1996 | Renzi | 6,125,385 A | 9/2000 | Wies et al. |

| | | | |
|---|---|---|---|
| 6,128,006 | A | 10/2000 | Rosenberg et al. |
| 6,131,097 | A | 10/2000 | Peurach et al. |
| 6,154,201 | A | 11/2000 | Levin et al. |
| 6,160,489 | A | 12/2000 | Perry et al. |
| 6,161,126 | A | 12/2000 | Wies et al. |
| 6,162,123 | A | 12/2000 | Woolston |
| 6,183,364 | B1 | 2/2001 | Trovato |
| 6,349,301 | B1 | 2/2002 | Mitchell et al. |
| 6,353,850 | B1 | 3/2002 | Wies et al. |
| 6,422,941 | B1 | 7/2002 | Thorner et al. |
| 6,686,911 | B1 | 2/2004 | Levin et al. |
| 6,859,819 | B1 | 2/2005 | Rosenberg et al. |
| 6,985,133 | B1 | 1/2006 | Rodomista |

FOREIGN PATENT DOCUMENTS

| | | |
|---|---|---|
| EP | 0265011 A1 | 4/1988 |
| EP | 0349086 | 1/1990 |
| EP | 0626634 | 5/1994 |
| EP | 0607580 A1 | 7/1994 |
| GB | 2254911 A | 10/1992 |
| JP | H2-185278 | 7/1990 |
| JP | H4-8381 | 1/1992 |
| JP | 4-34610 | 2/1992 |
| JP | H5-192449 | 8/1993 |
| JP | H7-24147 | 1/1995 |
| WO | WO9502233 | 1/1995 |
| WO | WO9502801 | 1/1995 |
| WO | WO9510080 | 4/1995 |
| WO | WO9520787 | 8/1995 |
| WO | WO9520788 | 8/1995 |
| WO | WO9532459 | 11/1995 |
| WO | WO9616397 | 5/1996 |
| WO | WO9622591 | 7/1996 |
| WO | WO9642078 | 12/1996 |
| WO | WO9712337 | 4/1997 |
| WO | WO9712357 | 4/1997 |
| WO | WO9719440 | 5/1997 |
| WO | WO9721160 | 6/1997 |
| WO | WO9731333 | 8/1997 |

OTHER PUBLICATIONS

United States Patent and Trademark Office, Office Action, U.S. Appl. No. 09/153,781, mailed Dec. 10, 2007.
United States Patent and Trademark Office, Office Action, U.S. Appl. No. 09/153,781, mailed May 17, 2007.
United States Patent and Trademark Office, Office Action, U.S. Appl. No. 09/153,781, mailed Oct. 11, 2006.
United States Patent and Trademark Office, Office Action, U.S. Appl. No. 09/153,781, mailed May 22, 2006.
United States Patent and Trademark Office, Office Action, U.S. Appl. No. 09/153,781, mailed Aug. 11, 2004.
United States Patent and Trademark Office, Office Action, U.S. Appl. No. 09/153,781, mailed Aug. 27, 2003.
United States Patent and Trademark Office, Office Action, U.S. Appl. No. 09/153,781, mailed Feb. 26, 2003.
United States Patent and Trademark Office, Office Action, U.S. Appl. No. 09/153,781, mailed Oct. 22, 2002.
United States Patent and Trademark Office, Office Action, U.S. Appl. No. 09/153,781, mailed Mar. 14, 2002.
United States Patent and Trademark Office, Office Action, U.S. Appl. No. 10/615,927, mailed Jul. 21, 2008.
United States Patent and Trademark Office, Office Action, U.S. Appl. No. 10/615,927, mailed Dec. 11, 2007.
United States Patent and Trademark Office, Office Action, U.S. Appl. No. 11/232,576, mailed Oct. 21, 2008.
United States Patent and Trademark Office, Office Action, U.S. Appl. No. 10/314,400, mailed Nov. 10, 2008.
United States Patent and Trademark Office, Office Action, U.S. Appl. No. 11/227,610, mailed Nov. 17, 2008.
United States Patent and Trademark Office, Office Action, U.S. Appl. No. 10/615,927, mailed Dec. 9, 2008.
"Foot-Operated Mouse," IBM Technical Disclosure Bulletin, Apr. 1986, vol. 28, No. 11.
"High Performance Model of the Immersion Probe," Immersion-Probe-MD™, Immersion Human Interface Corporation.
"Proceedings of the IFIP Congress 65," International Federation for Information Processing, Information Processing 1965, vol. 3, New York, May 24-29, pp. 506.
"The Personal Digitizer™," Immersion Human Interface Corporation 1994.
"Useful Technology for Your Idea File," Design News, Mar. 7, 1994, pp. 63.
3D Human Interface Tool, Immersion Probe™, Immersion Human Interface Corporation 1994.
Slocum, Precision Machine Design, , Prentice Hall, pp. 661, 664.
Cursor Walso, "Designer's Corner-Useful Technology for Your Idea File." Design News, Mar. 7, 1993, p. 63.
IBM Technical Disclosure Bulletin, "Mouse Ball-Actuating Device With Force and Tactile Feedback," vol. 32, No. 9B, Feb. 1990.
Adachi, Yoshitaka et al., "Sensory Evaluation of Virtual Push-Buttons," Technical Research Center, Suzuki Motor Corporation, Nov. 1994.
Adelstein, "A Virtual Environment System for the Study of Human Arm Tremor," Ph.D. Dissertation, Dept. of Mechanical Engineering, MIT, Jun. 1989.
Adelstein, Bernard D. et al., "A High Performance Two Degree-of-Freedom Kinesthetic Interface," Massachusetts Institute of Technology 1992, pp. 108-112.
Adlestein, Bernard D. et al, "Design and Implementation of a Force Reflecting Manipulandum for Manual Control Research," 1992, pp. 1-24.
Akamatsu, M. et al., "Multimodal Mouse: A Mouse-Type Device with Tactile and Force Display," Presence, vol. 3, No. 1, Winter 1994, pp. 73-80.
Albers, F. Gerry, "Microcomputer Base for Control Loading," Naval Training Equipment Center 11th NTEC-Industry Conference Proceedings, NAVTRAEQUIPCENT IH-306, 1978.
Ansley, D., "Thimble gets in touch with reality," New Scientist 1994, p. 19.
Atkinson, William D. et al., "Computing with Feeling," Comput. & Graphics, vol. 2, No. 2-E, pp. 97-103.
Baigrie, "Electric Control Loading—A Low Cost, High Performance Alternative," Proceedings, pp. 247-254, Nov. 6-8, 1990.
Batter, James J. et al., "Grope-1: A Computer Display to the Sense of Feel," pp. TA-4-188-TA-4-192.
Bejczy, Antal K., "The Phantom Robot: Predictive Displays for Teleoperation with Time Delay," IEEE 1990, pp. 546-550.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings of Fourth CISM-IFToMM, Sep. 8-12, 1981.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy et al., "A Laboratory Breadboard System for Dual-Arm Teleoperation," SOAR '89 Workshop, JSC, Houston, TX, Jul. 25-27, 1989.
Bejczy, et al., "Tele-Virtual Reality of Dynamic Mechanical Model," Proceedings of the 1992 IEEE/RSJ International Conference on Intelligent Robots and Systems, Raleigh, NC, Jul. 7-10, 1992.
Brooks, Jr., F., et al., "Project GROPE-Haptic Displays for Scientific Visualization," Computer Graphics, vol. 24, No. 4, Aug. 1990, pp. 177-185.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea, Grigore et al., "A Portable Dextrous Master with Force Feedback," Presence: Teleoperators and Virtual Environments, MIT Press, Jun. 1991.
Burdea, Grigore et al., "Distributed Virtual Force Feedback, Lecture Notes for Workshop on Force Display in Virtual Environments and its Application to Robotic Teleoperation," 1993 IEEE International Conference on Robotics and Automation, May 2, 1993, pp. 25-44.
Burdea, Grigore, et al., "Dextrous Telerobotics with Force Feedback-An Overview," Robotica 1991, vol. 9.

Buttolo, Pietro et al., "Pen-Based Force Display for Precision Manipulation in Virtual Environments," IEEE Mar. 1995, pp. 1-8.

Caldwell, et al., "Enhanced Tactile Feedback (Tele-Taction) Using a Multi-Functional Sensory System," 1050-4729/93, pp. 955-960, 1993.

Colgate, J. Edward et al., "Implementation of Stiff Virtual Walls in Force-Reflecting Interfaces," Sep. 22, 1993, pp. 1-9.

Eberhardt et al., "OMAR—A Haptic display for speech perception by deaf and deaf-blind individuals," IEEE Virtual Reality Annual International Symposium, Seattle, WA, Sep. 18-22, 1993.

Ellis, R.E. et al., "Design and Evaluation of a High-Performance Prototype Planar Haptic Interface," ASME Dec. 3, 1993, DSC-vol. 49, pp. 55-64.

Fischer, Patrick et al., "Specification and Design of Input Devices for Teleoperation," 1990.

Fisher, S.S. et al., "Virtual Environment Display System," ACM Interactive 3D Graphics, Oct. 1986.

Gossweiler et al., "An Introduced Tutorial for Developing Multi-User Virtual Environments," Presence: Teleoperators and Virtual Environments, MIT Press, 3(4), Fall 94 pp. 255-264.

Gotow, J.K., et al., "Perception of Mechanical Properties at the Man-Machine interface," IEEE 1987, pp. 688-689.

Gotow et al., "Controlled Impedance Test Apparatus for Studying Human Interpretation of Kinesthetic Feedback," WA11-11:00, pp. 332-337.

Hannaford, B. et al., "Force Feedback Cursor Control," NASA Tech Brief, vol. 13, No. 11, Item #21, 1989, pp. 1-4.

Hannaford, Blake et al., "Performance Evaluation of a Six-Axis Generalized Force-Reflecting Teleoperator," IEEE May/Jun. 1991, vol. 21, No. 3, pp. 620-633.

Hasser, Christopher John, "Tactile Feedback for a Force-Reflecting Haptic Display," The School of Engineering, University of Dayton, Dec. 1995, pp. iii-xii & 1-96.

Herndon, J.N. et al., "The State-of-the-Art Model M-2 Maintenance System," Proc. of the 1984 Natl Meeting on Robotics and Remote Handling in Hostile Environments, American Nuclear Society, 1984, pp. 59-65.

Hirota, K., et al., "Development of Surface Display," IEEE 0-7803-1363-1, 1993, pp. 256-262.

Howe, Robert D., "Task Performance with a Dextrous Teleoperated Hand System," Proceedings of SPIE, Nov. 1992, vol. 1833, pp. 1-9.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Iwata, Hiroo et al., "Volume Haptization," IEEE 1993, pp. 16-18.

Iwata, Hiroo, "Artificial Reality with Force-Feedback: Development of Desktop Virtual Space with Compact Master Manipulator," Computer Graphics, vol. 24, No. 4, 1990, pp. 165-170.

Iwata, Hiroo, "Pen-based Haptic Virtual Environment," Institute of Engineering Mechanics, University of Tsukuba, Japan, pp. 287-292.

Jacobsen, S.C. et al., "High Performance, High Dexterity, Force Reflective Teleoperator II," ANS Topical Meeting on Robotics & Remote Systems, Albuquerque, New Mexico Feb. 24-27, 1991, pp. 1-10.

Jones, L.A., et al., "A Perceptual Analysis of Stiffness," Experimental Brain Research, vol. 79, No. 1, pp. 150-156, 1990.

Kelley, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.

Kelley, A. J. et al., "On the Development of a Force-Feedback Mouse and its integration into a Graphical User Interface," Symp. on Haptic Interfaces for Virtual Environment and Teleoperator Systems, 1994 Int'l Mechanical Engineering Congress and Exhibition, Chicago, IL., Nov. 1994, pp. 1-8.

Kilpatrick. P., "The use of a Kinesthetic Supplement in an Interactive Graphics System," University of North Carolina, 1976, pp. 1-175.

Kim, Won S. et al., "A Teleoperation Training Simulator with Visual and Kinesthetic Force Virtual Reality."

Kim, Won S. et al., "Graphics Displays for Operator Aid in Telemanipulation," IEEE 1991, pp. 1059-1067.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kotoku, Tetsuo et al., "Environment Modeling for the Interactive Display (EMID) Used in Telerobotic Systems," IEEE Nov. 3-5, 1991, pp. 99-1004.

Kotoku, Tetsuo, "A Predictive Display with Force Feedback and its Application to Remote Manipulation System with Transmission Time Display," IEEE 1992, 1992; pp. 239-246.

Krishna Roy, "Virtual Presence Takes Surgeons through the Virtual Keyhole to Hone Their Skills", Business & Industry, Jul. 4, 1995.

Krueger, Myron W., Artificial Reality 1988, pp. 54-75.

McAffee, Douglas A., "Teleoperator System/Telerobot Demonstrator: Force Reflecting Hand Controller Equipment Manual," JPL D-5172, pp. 1-50, A1-A36, B1-B5, C1-C36, Jan. 1988.

Marcus, "Touch Feedback in Surgery," Proceedings of Virtual Reality and Medicine the Cutting Edge, Sep. 8-11, 1994.

Meyer, Kenneth et al., "A Survey of Position Trackers," The Massachusetts Institute of Technology 1992, Presence, vol. 1, No. 2.

Millman, P. et al., "Design of a Four-Degree-of-Freedom Force-Reflecting Manipulandum with a Specified Force/Torque Workspace," IEEE CH2969-4, 1991, pp. 1488-1493.

Minsky, Margaret et al., "Feeling and Seeing: Issues in Force Display," ACM 1990, pp. 235-242.

Minsky, "Computational Haptics: The Sandpaper System for Synthesizing Texture for a Force-Feedback Display," Ph.D. Disseration, MIT, Jun. 1995.

Munch, S. et al., "Intelligent Control for Haptic Displays," Eurographics '96, vol. 15, No. 3, Eurographics Association, 1996, pp. C217-C226.

Noll, A. Michael, "Man-Machine Tactile Communication Dissertation," Polytechnic Institute of Brooklyn, Jun. 1971, pp. 1-88.

Noll, "Man-Machine Tactile," SID Journal, Jul./Aug. 1972 Issue.

Ouh-Young, Ming et al., "Creating an Illusion of Feel: Control Issues in Force Display," University of North Carolina, 1989, pp. 1-14.

Ouh-Young, Ming et al., "Force Display Performs Better than Visual Display in a Simple 6-D Docking Task," IEEE 1989, pp. 1462-1466.

Ouh-Young, Ming et al., "Using a Manipulator for Force Display in Molecular Docking," IEEE 1988, pp. 1824-1829.

Ouh-Young, Ming, "Force Display in Molecular Docking," Chapel Hill 1990, p. 1-369.

Ouh-Young, "A Low-Cost Force Feedback Joystick and Its Use in PC Video Games," IEEE Transactions on Consumer Electronics, vol. 41, No. 3, Aug. 1995.

Patrick et al.,"Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Payette, J. et al., "Evaluation of a Force Feedback (Haptic) Computer Pointing Device in Zero Gravity," DSC-vol. 58, Proc. of ASME Dynamics Systems, ASME 1996, pp. 547-553.

Rabinowitz et al., "Multidimensional tactile displays: Identification of vibratory intensity, frequency, and contactor area," Journal of The Acoustical Society of America, vol. 82, No. 4, Oct. 1987.

Ramstein et al, "The Pantograph: A large Workspace Haptic Device for a Multimodal Human-Computer Interaction," Computer-Human Interaction, CHI '94, pp. 1-3.

Ramstein, C., "Combining Haptic and Braille Technologies: Design Issues and Pilot Study," ASSETS '96, ACM 0-89791-776-6, 1996, pp. 37-44.

Repperger, D.W., "Active Force Reflection Devices in Teleoperation," IEEE Control Systems.

Rosenberg, Louis, Ph.D., "Using Force Feedback to Enhance Human performance in Graphical User Interfaces," Apr. 1996.

Rosenberg et al., "Commercially Viable Force Feedback Controller for Individuals with Neuromotor Disabilities," Crew Systems Directorate, AL/CF-TR-1997-0016, 1996, pp. 1-33.

Rosenberg et al., "The use of force feedback to enhance graphical user interfaces," Stereoscopic Displays and Virtual Reality Systems III, 1996, pp. 243-248.

Rosenberg, L., "'Virtual fixtures': Perceptual Overlays Enhance Operator Performance in Telepresence Tasks", Stanford University, Jun. 1994, pp. 1-214.

Rosenberg, Louis B. et al. "Perceptual Decomposition of Virtual Haptic Surfaces," IEEE, Oct. 1993.

Rosenberg, Louis B., "Perceptual Design of a Virtual Rigid Surface Contact," Center for Design Research Stanford University, Air Force Material Command, Apr. 1993, pp. 1-41.

Rosenberg, Louis B., "The Use of Virtual Fixtures as Perceptual Overlays to Enhance Operator Performance in Remote Environments," Air Force Material Command, Sep. 1992, pp. 1-42.

Rosenberg, Louis B., "The Use of Virtual Fixtures to Enhance Operator Performance in Time Delayed Teleoperation," Armstrong Laboratory, Mar. 1993, pp. 1-45.

Rosenberg, Louis B., "Virtual Fixtures as Tools to Enhance Operator Performance in Telepresence Environments," SPIE Telemantpulator Technology, 1993.

Rosenberg, Louis B., "Virtual Haptic Overlays Enhance Performance in Telepresence Tasks," SPIE, 1994.

Rosenberg, Louis B., Crew Systems Directorate Biodynamics and Biocommunications Division Wright-Patterson, Air Force Material Command, Mar. 1993, pp. 1-45.

Russo, Massimo Andrea, "The Design and Implementation of a Three Degree-of-Freedom Force Output Joystick," Department of Mechanical Engineering, May 11, 1990, pp. 9-40 & 96 & 97.

Russo, "Controlling Dissipative Magnetic Particle Brakes in Force Reflective Devices." DSC-vol. 42, Advances in Robotics, pp. 63-70, ASME 1992.

Schmult, Brian et al., "Application Areas for a Force-Feedback Joystick," ASME 1993, DSC-vol. 49, pp. 47-54.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Smith, Geoffrey, "Call it Palpable Progress," Business Week, Oct. 9, 1995, p. 93, 96.

Snow, et al., "Model-X Force-Reflecting-Hand-Controller," NT Control No. MPO-17851; JPL Case No. 5348, pp. 1-4, Jun. 15, 1989.

Snow, E. et al., "Compact Force-Reflecting Hand Controller," JPL, Apr. 1991, vol. 15, No. 3, Item No. 153, pp. 1-15a.

Stanley et al., "Computer Simulation of Interacting Dynamic Mechanical Systems Using Distributed Memory Parallel Processors," DSC-vol. 42, Advances in Robotics, pp. 55-61, ASME 1992.

Su, S. Augustine et al., "The Virtual Panel Architecture: A 3D Gesture Framework," IEEE 1993, pp. 387-393.

Tadros, Control System Design for a Three Degree of Freedom Virtual Environment Simulator Using Motor/Brake Pair Actuators, MIT Archive, pp. 1-88, Feb. 1990.

Tan, Hong Z et al., "Manual Resolution of Compliance When Work and Force Cues are Minimized," ASME 1993, DSC-vol. 49, pp. 99-104.

Tan, Hong Z. et al., "Human Factors for the Design of Force-Reflecting Haptic Interfaces," Tan, Srinivasan, Eberman, & Chang, ASME WAM 1994, pp. 1-11.

Tavkhelidze, D.S. Kinematic Analysis of Five-Link Spherical Mechanisms, Mechanism and Machine Theory 1974, vol. 9, pp. 181-190.

Terry et al., "Tactile Feedback in a Computer Mouse," Proceedings of Fourteenth Annual Northeast Bioengineering Conference, University of New Hampshire, Mar. 10-11, 1988.

Wiker, S. et al., "Development of Tactile Mice for Blind Access to Computers: Importance of Stimulation Locus, Object Size, and Vibrotactile Display Resolution," Proc. of the Human Factors Society $35^{th}$ Annual Meeting 1991, , pp. 708-712.

Winey III, C.Alvin McCoy, "Computer Simulated Visual and Tactile Feedback as an Aid to Manipulator and Vehicle Control," Mstr of Science in Mechanical Engineering, MIT Jun. 1981, pp. 1-80.

Yamakita, M. et al., Tele-Virtual Reality of Dynamic Mechanical Model, Proceedings of the 1992 IEEE/RSJ International Conference on Intelligent Robots and Systems, Raleigh, NC. Jul. 7-10, 1992, pp. 1103-1110.

Yokokohji et al., "What You Can See is What You Can Feel—Development of a Visual/Haptic Interface to Virtual Environment," Proceedings of VRAIS '96, IEEE 1996, pp. 46-54.

The American Society of Mechanical Engineers—(copyright 1997)—Proceedings of the ASME Dynamic Systems and Control Division—Presented at the 1997 ASME International Mechanial Engineering Congress and Exposition—Nov. 16-21, 1997, Dallas, Texas.

United States Patent and Trademark Office, Office Action, U.S. Appl. No. 10/314,400, mailed Jun. 13, 2008.

United States Patent and Trademark Office, Office Action, U.S. Appl. No. 09/153,781, mailed Jun. 17, 2008.

United States Patent and Trademark Office, Office Action, U.S. Appl. No. 11/455,944, mailed Jul. 16, 2008.

United States Patent and Trademark Office, Office Action, U.S. Appl. No. 11/603,294, mailed Mar. 6, 2008.

```
<HTML> ~162
<BODY> ~164
  ⋮ } ~166
<CENTER> ~168
<EMBED "FORCEBUTTON.IFF; ~172
    SIZE = 100,100 ~174
    INITSTATE = UP ~176
    FORCEEFFECT = VIBRATION(PARAMS) ~178
    TRIGGER = MOUSEWITHIN(PARAMS) +
             BUTTONSTATE ~182
    ICON = LOUIS.GIF ~184
    TEXT = "HI, I'M LOUIS" ~186
    FONT = HELVETICA ~188
>
</CENTER> ~190
  ⋮ } ~192
</BODY> ~194
</HTML> ~196
```

```
FOR (INT i = 0; i < 5; i++)   ~200
    VIBRATE(PARAMS);          ~202
    WAIT 5;                   ~204
```

*Figure 7b*

NETWORKED APPLICATIONS INCLUDING HAPTIC FEEDBACK

CROSS-REFERENCES TO RELATED APPLICATION

The present application is a continuation of U.S. patent application Ser. No. 10/615,927, filed Jul. 10, 2003, entitled "Networked Applications Including Haptic Feedback," which is a continuation of U.S. patent application Ser. No. 09/153,781, filed Sep. 16, 1998, entitled "Networked Applications Including Haptic Feedback," which is also a continuation-in-part of U.S. patent application Ser. No. 09/050,665, now U.S. Pat. No. 6,219,033, filed Mar. 30, 1998, entitled "Method and Apparatus for Controlling Force Feedback Interface Systems Utilizing a Host Computer," which is a continuation of U.S. patent application Ser. No. 08/691,852, now U.S. Pat. No. 5,956,484, entitled "Method and Apparatus for Providing Force Feedback over a Computer Network," filed Aug. 1, 1996, and a continuation of U.S. patent application Ser. No. 08/664,086, now U.S. Pat. No. 6,028,593, filed Jun. 14, 1996, entitled "Method and Apparatus for Providing Simulated Physical Interactions within Computer Generated Environments," and claims priority to U.S. Provisional Patent Application No. 60/017,803, filed May 17, 1996, and is also a continuation of U.S. patent application Ser. No. 08/571,606, now U.S. Pat. No. 6,219,032, filed Dec. 13, 1995, entitled "Method and Apparatus for Providing Force Feedback for a Graphical User Interface," which is a continuation of U.S. patent application Ser. No. 08/566,282, now U.S. Pat. No. 5,734,373, filed Dec. 1, 1995, entitled "Method and Apparatus for Controlling Force Feedback Interface Systems Utilizing a Host Computer," the entirety of all of which are hereby incorporated by reference.

BACKGROUND

This invention relates generally to human/computer interfaces, and more particularly to human/computer interfaces with force feedback that can operate over a network.

Computer networks have become essential to allow users and computers to communicate with each other. Users transmit and receive data over networks in offices, at home, or in portable devices, and do so for a variety of tasks and applications, including communication, distribution, and entertainment. Many different types of networks are used. Local Area Networks (LANs) are typically provided in a limited area and include a relatively small number of computer nodes. The most large scale example of a network is the Internet, which has become extremely popular. The Internet is a Wide Area Network (WAN) that is structured and distributed such that no one authority or entity manages the network. Different communication protocols can be used over networks to allow computers to communicate with each other; for example, protocols such as "Transmission Control Protocol/Internet Protocol" (TCP/IP) and the "World Wide Web" (WWW) are used over the Internet. TCP/IP sends "packets" of data between a host machine, e.g. a server computer on the Internet, and a client machine, e.g. a user's personal computer connected to the Internet, or between two client machines. The WWW is an Internet interface protocol which is supported by the same TCP/IP transmission protocol. Intranets are private networks based upon Internet standards, and have become quite common for managing information and communications within an organization. Intranets, since they adhere to Internet standards, can often use the same interface software as are used on the Internet, such as a web browser.

A variety of information is currently transferred over computer networks. For example, visual data, text data, and sound data can be transmitted over the Internet and the WWW. Image data can be sent from one client machine to another (or from a server machine to a client machine) in a variety of formats. Or, for example, data packets coded in TCP/IP format can be sent from one client machine to another over the Internet to transmit sound data. This last-mentioned technique forms the basis for Internet telephony.

While the transmission of visual images (both static and dynamic, i.e. video), text, and sound over networks, such as the Internet, is well-known, the transmission of other types of sensory data has not been well explored. In particular, the transmission of data over networks pertaining to the sense of touch and/or force has not been established. "Force feedback" allows a user to experience or "feel" tactile sensations as provided through computational information. Using computer-controlled actuators and sensors on a force feedback device, a variety of realistic sensations can be modeled and experienced by the user. This useful and highly immersive sensory modality for interacting with the Internet and other users over the Internet has hereto been unavailable.

SUMMARY

The present invention is related to the transmission of information pertaining to a subset of the sense of touch, i.e. the transmission of forces to a user over a computer network system. The "force feedback" provided by the methods and apparatus of the present invention enhance the sensory experience of user-to-user interactions to provide a richer, more interesting, and more enjoyable experience.

A network force feedback system in accordance with the present invention includes a network, a first computer coupled to the network, and a second computer coupled to the network. The first and second computers each include a visual display and a force feedback interface device. The interface device is capable of providing a computer input to the computer and also includes an actuator to output force feedback to a user in response to a force feedback signal provided by the computer. At least one of the computers develops an image on the visual display that is associated with stored force feedback information, and produces the image and the force feedback signal based on information received from the other, remote computer. Preferably, the computers produce the images and the force feedback signals based on information received from the remote computer and based on the computer input from the local force feedback device. The force feedback device can include a local microprocessor that communicates with the computer such that the force feedback signal can take the form of a relatively high-level force command. The present invention therefore permits two computer users to interact using force feedback provided over a network on a client-to-client (peer-to-peer) basis.

A method for providing force feedback between two computers over a network includes establishing a connection between a first computer and a second computer over a network, sending first computer information to a second computer from the first computer over the network, and providing a force feedback signal to the second force feedback device from the second computer, where the force feedback signal is based on the first computer information. The force feedback signal causes the second force feedback device to output forces to the second user using an actuator of the force feedback device. Similarly, second computer information is sent to the first computer from the second computer over the network, and a force feedback signal is provided to the first force feedback device from the first computer. The force feedback signal is based on the second computer information, where the force feedback signal causes the first force feedback device to output forces to the first user using an actuator of the first force feedback device. The force feedback signal can also be based on the input information from the force feedback devices. The information sent over the network can include position information describing a position of a manipulandum of the force feedback devices, and/or can include force feedback information indicating a force sensation to be output by the remote force feedback device. The computers can each display a graphical environment having a first graphical object controlled by the first user and a second graphical object controlled by the second user.

In a different aspect, a method is disclosed of allowing two users to interact physically over a computer network, wherein a first manipulandum is physically contacted and moved by a first user in at least one degree of freedom and a second manipulandum is physically contacted and moved by a second user in at least one degree of freedom. First information is transmitted over the computer network, including an indication of movement of the first manipulandum, to a second manipulandum physically contacted by a second user. A force is applied to the second manipulandum based on the indication of movement of the first manipulandum such that the second user feels an interaction based on movement of the first manipulandum. Second information is similarly transmitted to the first manipulandum such that the first user feels an interaction based on movement of the second manipulandum. Two users can thus physically exchange information and interact over a computer network.

The present invention adds a new sensory modality when interacting with a networked computer system. More particularly, force information can be either downloaded to a client machine from a server machine connected to the network, or force information can be passed between two or more client machines on the network. Peer-to-peer or server-to-peer direct interaction allows two or more users to interact using a different sensory modality, the sense of touch. The interaction may be subject to some transmission ("latency") delays on networks such as the Internet, but permits remote interactivity with a client's force feedback device in new ways to enhance communication and interaction between users.

These and other advantages of the present invention will become apparent upon reading the following detailed descriptions and studying the various figures of the drawings.

BRIEF DESCRIPTION OF THE DRAWINGS

FIG. 4b is a cross-sectional view taken along line 4b-4b of FIG. 4a;

FIG. 5b is a perspective view of a first alternate embodiment for the force feedback device of FIG. 5a;

FIG. 5c is a perspective view of a second alternate embodiment of the force feedback device of FIG. 5a;

FIG. 7b is an example of an HTML file of the present invention sent from a web server machine to a client machine;

FIG. 8 is a flow-diagram of the "Parse and Interpret HTML Component" step of FIG. 7a;

DETAILED DESCRIPTION

Figure 1:
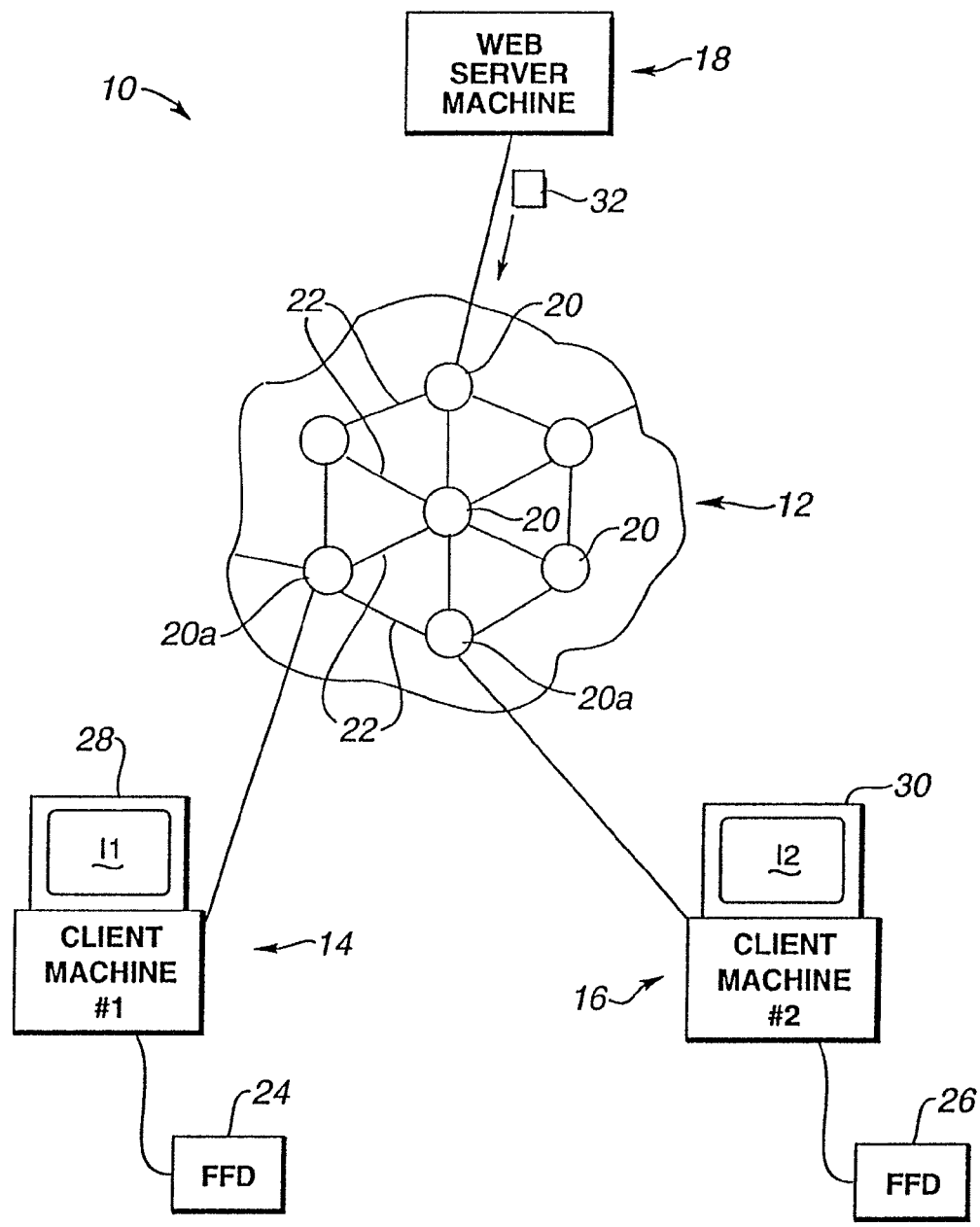
FIG. 1 is a pictorial representation of the Internet, a web server machine, and two client machines.

In FIG. 1, a network system 10 includes a network and a number of computers or "machines" coupled to the network. In the described example of FIG. 1, the network is the Internet 12. For example, a first client machine 14, a second client machine 16, and a web server machine 18, are coupled to the Internet 12. Although embodiments specific to the current form of the Internet are described, it should be appreciated that the present invention can also be used in conjunction with many different types of networks (any LAN or WAN) using appropriate communication protocols. Such types of networks and the communications used over such networks are well known to those skilled in the art.

As noted previously, both the Internet 12 and Intranets operate using the same TCP/IP protocols. This allows Intranets to use similar or the same server machine software and client machine software as are used in Internet 12 applications. Therefore, it will be apparent to those skilled in the art that the following descriptions apply equally well to Internet, Intranet, and other forms of network systems that are compatible with the processes and apparatus disclosed herein.

The Internet 12 includes a number of nodes 20 that are interconnected by data transmission media 22. These nodes are typically routers, switches, and other intelligent data transmission apparatus which route "packets" of TCP/IP information to the desired destination. In some instances, the nodes 20 comprise an Internet service provider (ISP) 20a which allows a client machine to access the "backbone" of the Internet. Alternatively, client machines and web servers can be coupled directly into the backbone of the Internet.

As noted previously, the present invention is directed to the implementation of force feedback over a network, such as the Internet 12. To provide a user of a client machine with the experience of force feedback, force feedback human/computer interfaces (hereafter "force feedback devices") 24 and 26 can be provided as part of the client machines 14 and 16, respectively. The client machines 14 and 16 are typically provided with computer video monitors 28 and 30 (which is one example of a "visual display"), respectively, which can display images I1 and I2, respectively. Preferably, forces developed by force feedback devices 24 and 26 are correlated with the images I1 and I2 of the client machines 14 and 16, respectively.

The machines 14-18 are considered, in the language of the Internet, to be "resources," and each has its own unique Uniform Resource Locator or "URL." In one embodiment of the present invention, a client machine, such as client machine 14 or 16, sends a request for a "web page" residing on, for example, web server machine 18. This is accomplished by the client machine sending a connection request and a URL which specifies the address of the web page to the web server machine 18. The web server machine 18 then sends a web page 32 written in HTML format back to the requesting client machine where it is "cached" in the memory (typically the RAM, hard disk, or a combination of the two) of the client machine. In this embodiment of the invention, the image on the video display of the client machine is generated from the HTML web page file cached on the client machine, and force feedback is provided to a user through the force feedback device as he manipulates a user manipulable object of the force feedback device.

In a peer-to-peer aspect of the present invention, a first client machine, such as client machine 14, and a second client machine, such as client machine 16, directly communicate force feedback commands to each other in standard TCP/IP protocol over the Internet 12. More particularly, client machine 14 can send force feedback and other information to the URL of the client machine 16, and the client machine 16 can send force feedback and other information in standard TCP/IP packets to the URL of the client machine 14. In this way, users of client machine 14 and client machine 16 can interact physically over the Internet 12. Of course, a server machine 18 can likewise directly communicate force feedback commands to a client machine 12 or 14, or all three machines can interact. The client machines can also communicate directly over other types of networks and/or using other communication protocols. Peer-to-peer (i.e. client-to-client) communication is described below with reference to FIG. 11.

Figure 2:
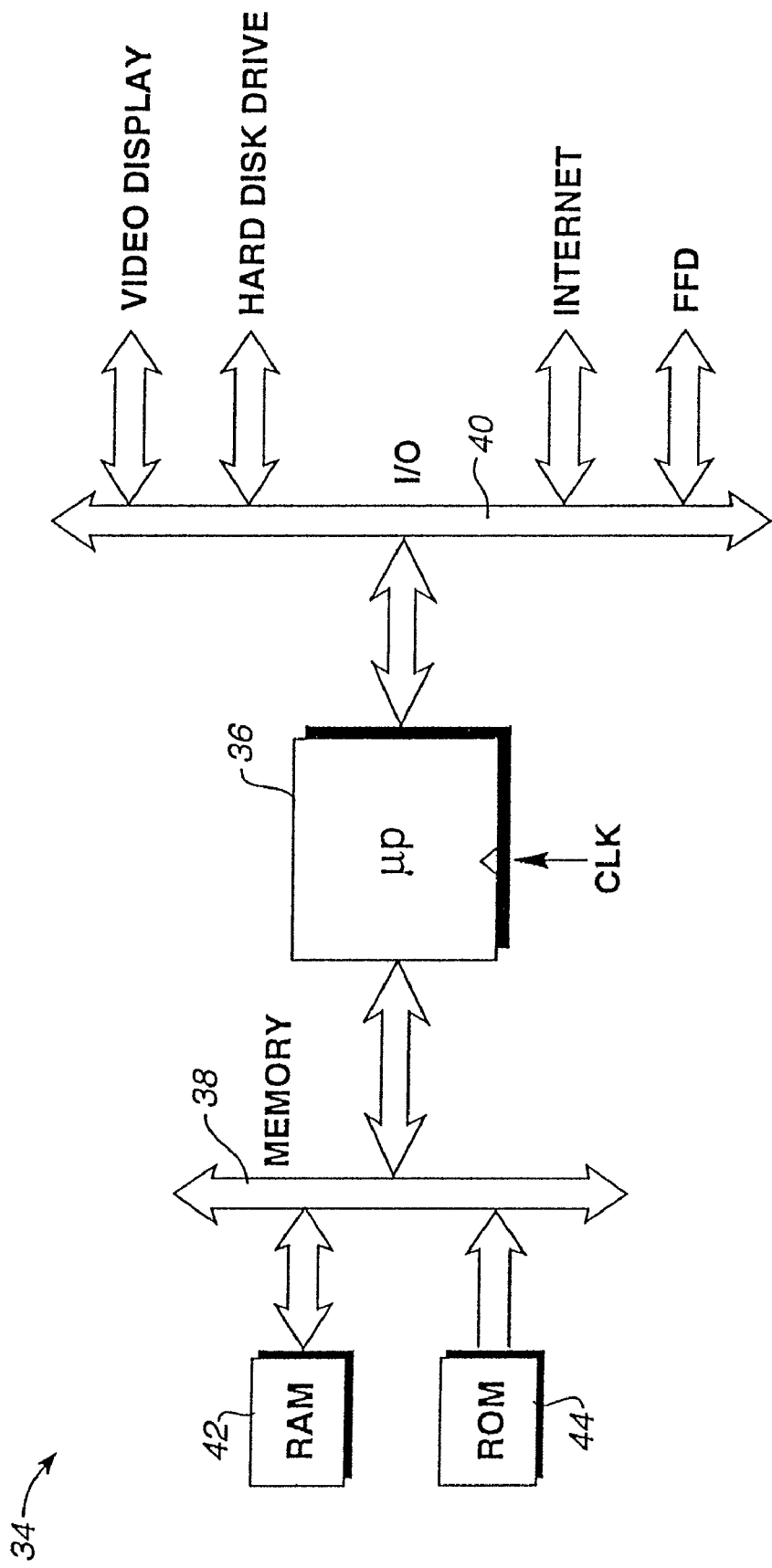
FIG. 2 is a block-diagram of a client machine used in the present invention.

In FIG. 2, a "personal" computer 34 architecture that can be used for client machine 14 or client machine 16 is shown in block diagram form. It should be noted that a variety of machine architectures can be used to access the Internet 12, i.e. can be used as "network access computers." The particular architecture shown for the computer 34 is a typical personal or "PC" computer architecture, such as that used with IBM compatible personal computers. Web server machines can also have similar architectures, but are often more powerful computers known as "workstations" that operate under some variant of the UNIX® operating system. The Internet service providers 20a are likewise often UNIX-based computers or powerful personal computers running Windows NT® The nodes 20 are most commonly routers built by Cisco Systems of San Jose, Calif. Client machine 14 or 16 can also take other forms, such as a television including or connected to a microprocessor for Internet access, or a video game console system such as those available from Nintendo, Sega, or Sony. Force feedback devices used with such client machines can be appropriate for the particular embodiment, e.g., a TV remote control used for internet browsing on the abovementioned television can include force feedback functionality.

The personal computer system 34 includes a microprocessor 36 clocked by a system clock CLK and which is coupled to a high speed or memory bus 38 and to a lower speed or I/O bus 40. The system RAM 42 and ROM 44 are typically coupled to the high speed memory bus, while various peripherals, such as the video display, hard disk drive, Internet interface (often either a modem or an Ethernet connection), and force feedback device, are typically coupled to the slower I/O bus. The microprocessor executes programs stored in the various memories (RAM, ROM, hard disk, etc.) of the personal computer 34 to control, for example, the image display on the video display and the forces provided by the force feedback device. The manufacture and use of personal computers, such as personal computer 34, are well-known to those skilled in the art.

Figure 3:
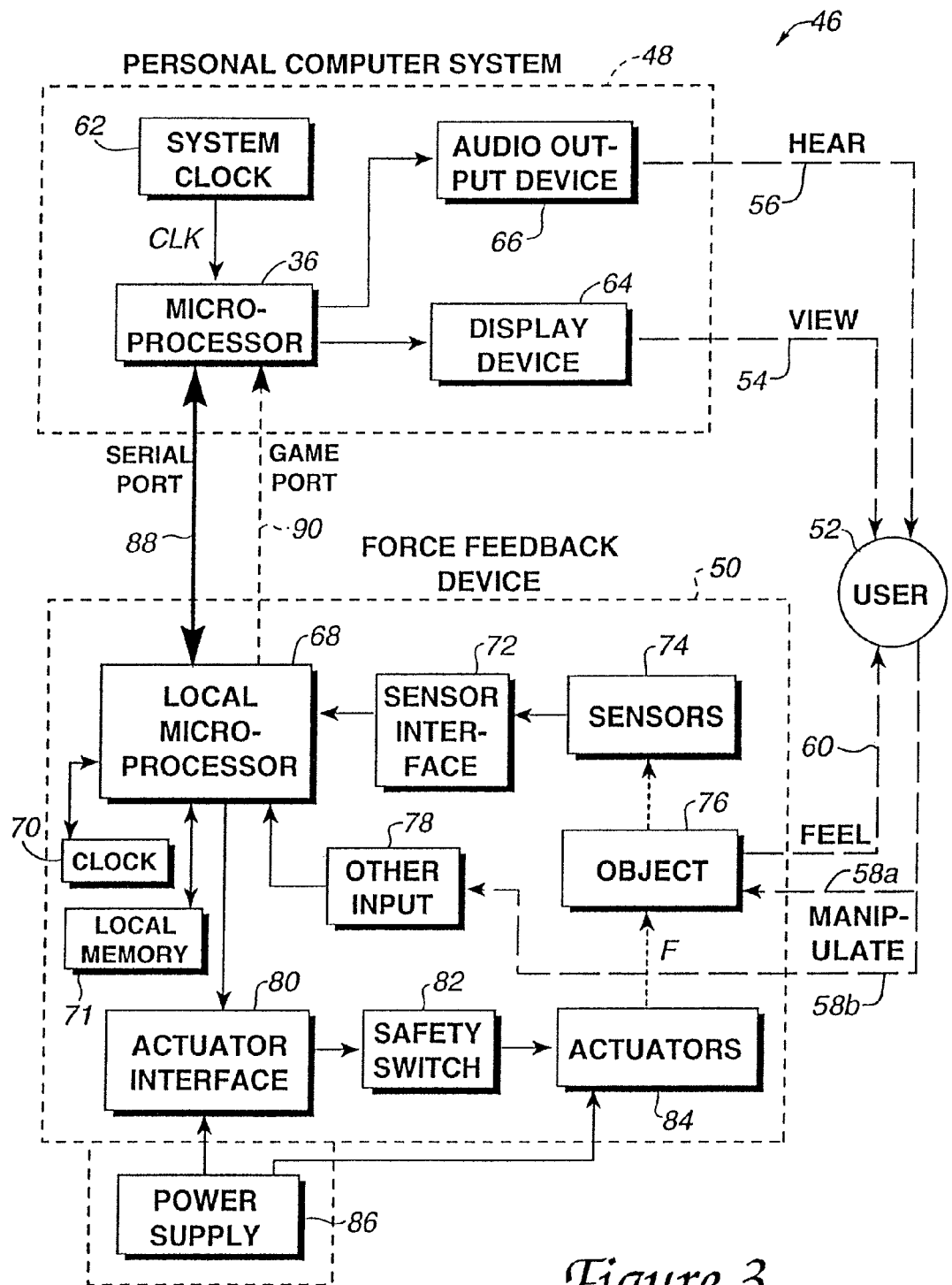
FIG. 3 is a block-diagram of a force feedback system in accordance with the present invention.

In FIG. 3, a client machine 46 in accordance with the present invention includes a personal computer system 48 and a force feedback human/computer interface or "force feedback device" 50. A user 52 can receive visual information 54 and auditory information 56 from the personal computer 48 and can manipulate the force feedback device 50 as indicated at 58a and 58b to provide input, e.g., to command a cursor location on a visual display or other provide other control information. In addition, the user 52 can receive force feedback 60 from the force feedback device 50 to represent physical "feel" sensations.

The personal computer system 48 includes the microprocessor 36, the system clock 62, a video monitor 64 (which is one type of "visual display"), and an audio device 66. The system clock 62, as explained previously, provides a system clock signal CLK to the microprocessor 36 and to other components of the personal computer system 48. The display device 64 and the audio output device 66 are typically coupled to the I/O bus 40 (not shown in this figure).

In this preferred embodiment, the force feedback device 50 preferably includes a local microprocessor 68, a local clock 70, optional local memory 71 for the local microprocessor 68, a sensor interface 72, sensors 74, a user manipulatable object 76, "other" input interface 78, an actuator interface 80, a safety switch 82, and actuators 84 which provide a force F to the object 76, and an optional power supply 86 to provide power for the actuator interface 80 and actuator 84.

The microprocessor 36 of the personal computer system 48 is coupled for communication with the local microprocessor 68 of the force feedback device 50. This communication coupling can be through a serial port coupling 88 to the personal computer system, or through a game port coupling 90 to the personal computer system. Virtually all personal computer systems built to the IBM PC/AT standards will include a serial port and a game port. As noted, the serial port will permit two-way communication between microprocessor 36 and microprocessor 38, and thus is preferable over the game port coupling which only permits one-way communication from the local processor 68 to the microprocessor 36. In consequence, a serial port connection between the personal computer system 48 and the force feedback device 50 will permit force feedback commands to be sent from the microprocessor 36 to the local microprocessor 68, while a game port connection alone will not be able to provide this function. However, some simpler forms of "reflex" type force feedback can still be provided by the force feedback device 50 under the control of the local microprocessor 68 even if only a slower interface is used. It should also be noted that the microprocessor 36 and a local microprocessor 68 may communicate over both the serial port and game port connection to provide a greater communication bandwidth. A preferred serial port is the Universal Serial Bus (USB) of a personal computer, although an RS-232 serial bus, or other serial busses, a parallel bus, an Ethernet bus, or other types of communication links can also be used.

In use, the user 52 of the client machine 46 grasps the user object 76 (or "manipulandum") of the force feedback device 50 and manipulates (i.e. exerts a force to move or attempt to move) the user object to cause a "pointer" or other graphical object to move in the image displayed by the display device 64. For example, a pointer typically takes the form of a small arrow, a pointing hand, or the like. The sensor 75 senses the movement of the user object 76 and communicates the movement to the local microprocessor 68 through the sensor interface 72. The local microprocessor 68 then communicates through serial port 88, game port 90, or both to the microprocessor 36 to cause the microprocessor 36 to create a corresponding movement of the pointer on the image displayed upon the visual display 64. In some embodiments, the sensors 74 can communicate directly to microprocessor 36 without the use of local microprocessor 68. The user can also create other input, such as a "button click," through the other input 78 which are communicated to the microprocessor 36 by the local microprocessor 68 or directly, e.g., using a game port. The user object 76 can take many forms, including a joystick, mouse, trackball, steering wheel, medical instrument, representation of a body part, gamepad controller, etc., as described in U.S. Pat. No. 5,734,373 and application Ser. Nos. 08/664,086 and 08/881,691, all incorporated by reference herein.

If the pointer on the display device 64 is at a position (or time) that correlates to a desired force feedback to the user 52, or an event occurs that dictates that force feedback should be output, the microprocessor 36 sends a force feedback command to the local microprocessor 68 over the serial port connection 88. The local microprocessor 68 parses this force feedback command and sends signals to the actuator interface 80 which causes the actuator 84 to create forces F on user object 76, which are experienced by the user 52 as indicated at 60. The safety switch 82, sometimes referred to as a "deadman switch", blocks the signal from the actuator interface 80 if, for example, the user 52 is no longer grasping the object 76. In this way, the user 52 can interact with the client machine 46 in a visual, auditory, and tactile fashion.

For example, when using the local microprocessor 68 to offload computational burden from the host computer, the host can send high level commands to the local microprocessor 68. The local microprocessor can parse or interpret the commands and implement a local force routine that is stored in local memory 71. Such a force routine might instruct the microprocessor 68 to read sensor positions, determine a force based on the sensor positions and command the actuators 84 to output the force, all in a local control loop independent from the host computer (the microprocessor 68 would also preferably relay the sensor positions to the host computer). Different force routines can be provided to command different types of force sensations (spring forces, damping forces, vibration forces, etc.). This local control loop can be helpful in increasing the response time for forces applied to the user object 76, which is essential in creating realistic and accurate force feedback. The hardware architecture described above is also described in U.S. Pat. No. 5,739,811, and the high level command protocol between the computer and the force feedback device is also described in U.S. Pat. No. 5,734,373, the disclosures of which are incorporated herein by reference.

In addition to sending force feedback commands, it may be convenient for host computer 48 to send a "spatial representation" to microprocessor 68, which is data describing the layout of all or some of the graphical objects displayed in the hosts' application program or graphical environment which are associated with forces and the types of these graphical objects (in the Web page embodiment, the layout/type of graphical objects can be downloaded from a remote computer providing the Web page). The microprocessor 68 can store such a spatial representation in memory 71, for example. In addition, the microprocessor 68 can be provided with the necessary instructions or data to correlate sensor readings with the position of the cursor on the display screen. The microprocessor would then be able to check sensor readings, determine cursor and target positions, and determine output forces independently of host computer 48. The host can implement operating system functions (such as displaying images) when appropriate, and low-speed handshaking signals can be communicated between processor 68 and host 48 to correlate the microprocessor and host processes. Also, memory 71 can be a permanent form of memory such as ROM or EPROM which stores predetermined force sensations (force models, values, reflexes, etc.) for microprocessor 68 that are to be associated with particular types of graphical objects.

The host can also send the microprocessor a positional offset that may have occurred between the graphical object or user object controlled by the user and the graphical object or user object controlled by a remote user in a game or simulation. The microprocessor can use the positional offset in the determination of forces. For example, a spring force can be implemented between the user manipulatable objects of two networked host computers, where the magnitude of the spring force is proportional to the positional offset between the two user objects. The spring force thus biases the user objects to synchronized positions.

Figure 4A:
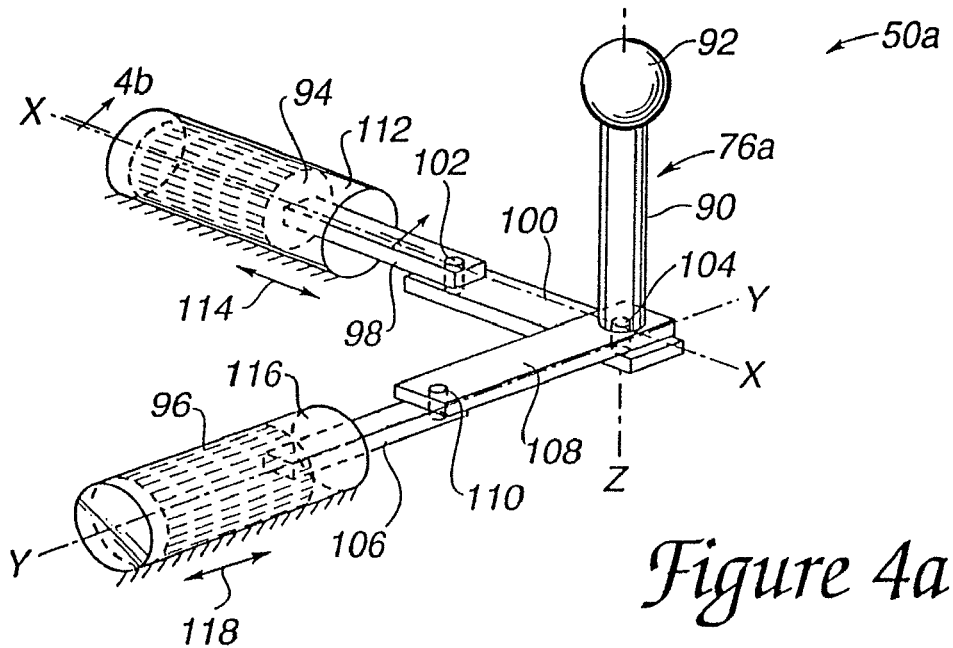
FIG. 4a is a perspective view of a preferred human/computer interface ("force feedback device") of the present invention.

In FIG. 4a, a force feedback device 50a is provided with a user manipulatable object 76a which, in this instance, includes a shaft 90 and a ball-grip (or joystick) 92. The force feedback device 50a also includes a pair of linear voice coil actuators ("voice coils") 94 and 96 that can serve both as sensors and actuators. Alternatively, the voice coils can be used only as actuators, and separate sensors (not shown) can be used. The voice coil 94 is coupled to the shaft 90 of object 76a by a first link 98 and a second link 100. Link 98 is coupled to link 100 with a pivot 102, and a link 100 is coupled to the shaft 90 by a pivot 104. Similarly, voice coil 96 is coupled to the shaft 90 of the object 76a by a first link 106 and a second link 108. The first link 106 is coupled to second link 108 by a pivot 110, and the link 108 is coupled to the shaft 90 of the object 76a by the pivot 104.

The link 98 can move in and out of a housing 112 as indicated by arrow 114, and link 106 can move in and out of a housing 116 of voice coil 96 as indicated by the arrow 118. The pivots 102, 104, and 110 allow the object 76a to move within the constraints of an x-y plane, but does not permit movement in a z direction orthogonal to the x-y plane. Therefore, the force feedback device is a two degree (2D) of freedom device. That is, the user manipulatable object 76a can move with a first degree of freedom in a x direction, and in a second degree of freedom in the y direction. A 2D force feedback device 50a is considered preferable in the present invention since it correlates well to the two-dimensional screen of a monitor of a client machine.

Figure 4B:
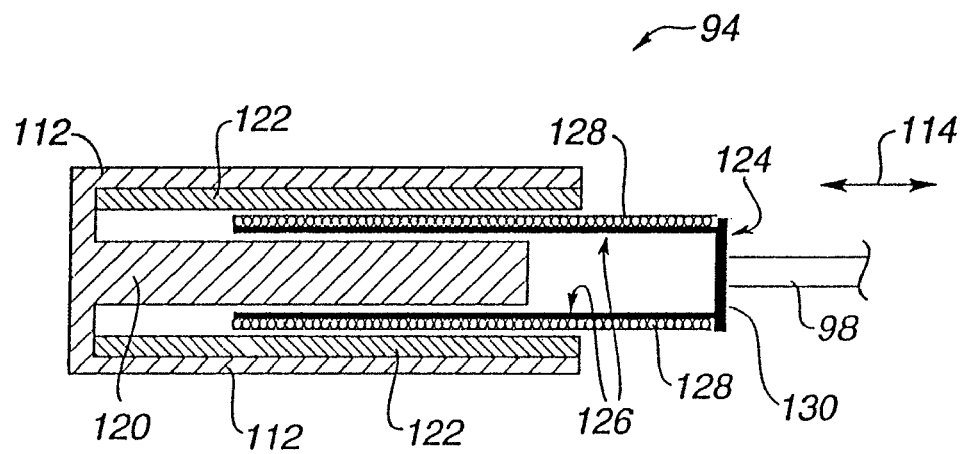

In FIG. 4b, a voice coil 94 is shown in a cross sectional view taken along line 4b-4b of FIG. 4a. The housing 112 includes a central core 120 and a number of elongated magnets 122. An armature 124 includes a hollow, cylindrical member having inner surface 126 which slidingly engages the core 120. Wrapped around the armature 124 are coils 128. The coils are electrically coupled to actuator and/or sensor interfaces. A plate 130 is attached to the end of the armature 124 and is coupled to the link 98. The armature 124 and link 98 can move in a linear fashion as indicated at 114. Other voice coil configurations can also be used, such as differently shaped cores, different coil layouts, etc.

The force feedback devices of FIGS. 4a and 4b are also described in U.S. Pat. No. 5,805,140, the disclosure of which is incorporated herein by reference. In particular, the operation of the voice coils as actuators and/or sensors is described therein.

Figure 5A:
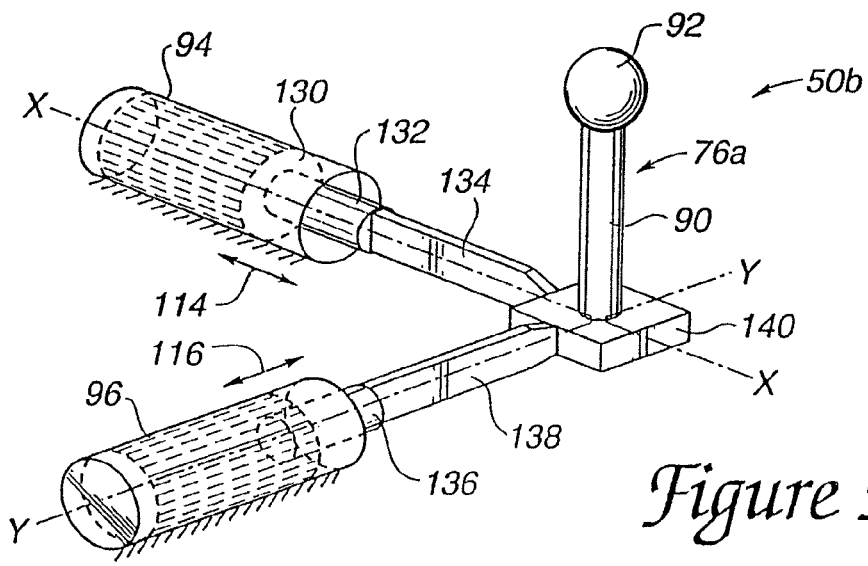
FIG. 5a is a perspective view of another preferred embodiment for a force feedback device in accordance with the present invention.

In FIG. 5a, an alternative embodiment of a force feedback device 50b is illustrated. The force feedback device 50b has many points of similarity with the force feedback device 50a, with like reference numerals referring to like elements. The force feedback device 50b includes the user manipulatable object 76a, the shaft 90, the ball knob 92, and the voice coils 94 and 96. However, the links of the force feedback device 50a have been replaced by flexure members. More particularly, the links 98 and 100 of force feedback device 50a have been replaced by a rigid connector 132 and a flexible member 134 (collectively comprising a "flexure member"), and the links 106 and 108 of the force feedback device 50a have been replaced by a connector member 136 and a flexible member 138 (also collectively comprising a flexure member). The connector 132 is rigidly is attached to the plate 130 at the end of the armature of the voice coil 94 and is rigidly attached to an end of the flexible member 134. The other end of the flexible member 134 is attached to a base 140 which, in turn, is rigidly attached to the shaft 90 of the object 76a. Similarly, the connector 136 is attached to a plate of an armature of voice coil 96 at one of its ends, and is attached to the flexible member 138 at the other of its ends. The remaining end of flexible member 138 is rigidly attached to the base 140.

The flexible members 134 and 138 serve the same functions as the links of the force feedback device 50a described previously. As the object 76a is moved back and forth along an x-y plane, the flexible member 134 can move in and out of the voice coil housings 94 and 96, respectively, and can bend to accommodate angular movement with respect to the x and y axis. This permits the connectors 132 and 136 to move back and forth within the voice coils 94 and 96, respectively. The force feedback device of FIG. 5a is also described in U.S. Pat. No. 5,805,140, the disclosure of which has been incorporated herein by reference.

Figure 5B:
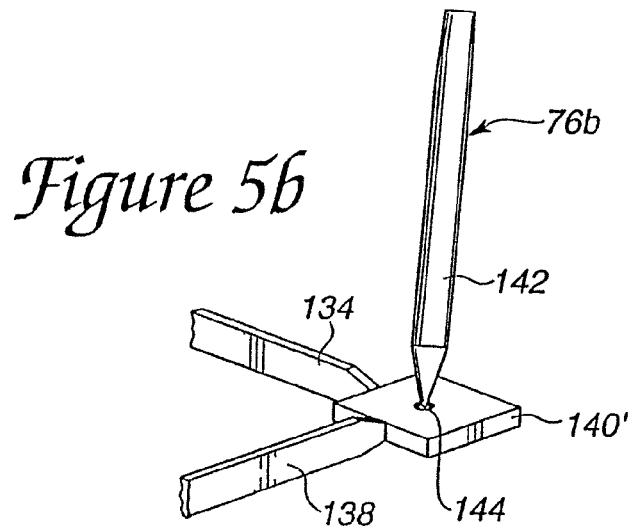

In FIG. 5b, an alternative user manipulatable object 76a takes the form of a stylus 142 which can engage an aperture 144 in an alternative base 140'. The alternative base 140' can be coupled to the flexible members 134 and 138 of the embodiment of FIG. 5a. Alternatively, the tip of stylus 142 can be rigidly or rotatably attached to alternative base 140' with, for example, a ball joint or other joint or fastener.

Figure 5C:
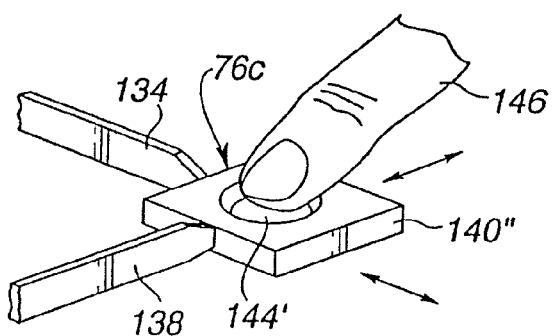

In FIG. 5c, another alternative base 140" is provided with an enlarged aperture 144' which can be engaged by the tip of a finger 146 of the user. The base 140" then becomes the user manipulatable object 76c. As before, the base 140" is coupled the flexible members 134 and 138 of the first feedback device 50b of FIG. 5a. The structures of FIGS. 5b and 5c are also described in U.S. Pat. No. 5,721,566, the disclosure of which is incorporated herein by reference.

The embodiments of FIGS. 5b and 5c illustrate two of a range of equivalent user manipulatable objects suitable for the present invention. It should be apparent to those skilled in the art that these alternative objects 76b of FIGS. 5b and 76c of FIG. 5c can equally well be used with other force feedback devices, such as the force feedback device 50a illustrated in FIG. 4a.

As noted previously, a preferred embodiment of the present invention provides a user manipulatable object that has two degrees of freedom. Other user manipulatable objects having one degree of freedom or three or more degrees of freedom are also within the scope of the present invention. For example, one embodiment of the present invention provides only one degree of freedom. Other force feedback devices of the present invention include mice, joysticks, joypads, a steering wheel, and yolks having two or more degrees of freedom.

Figure 6:
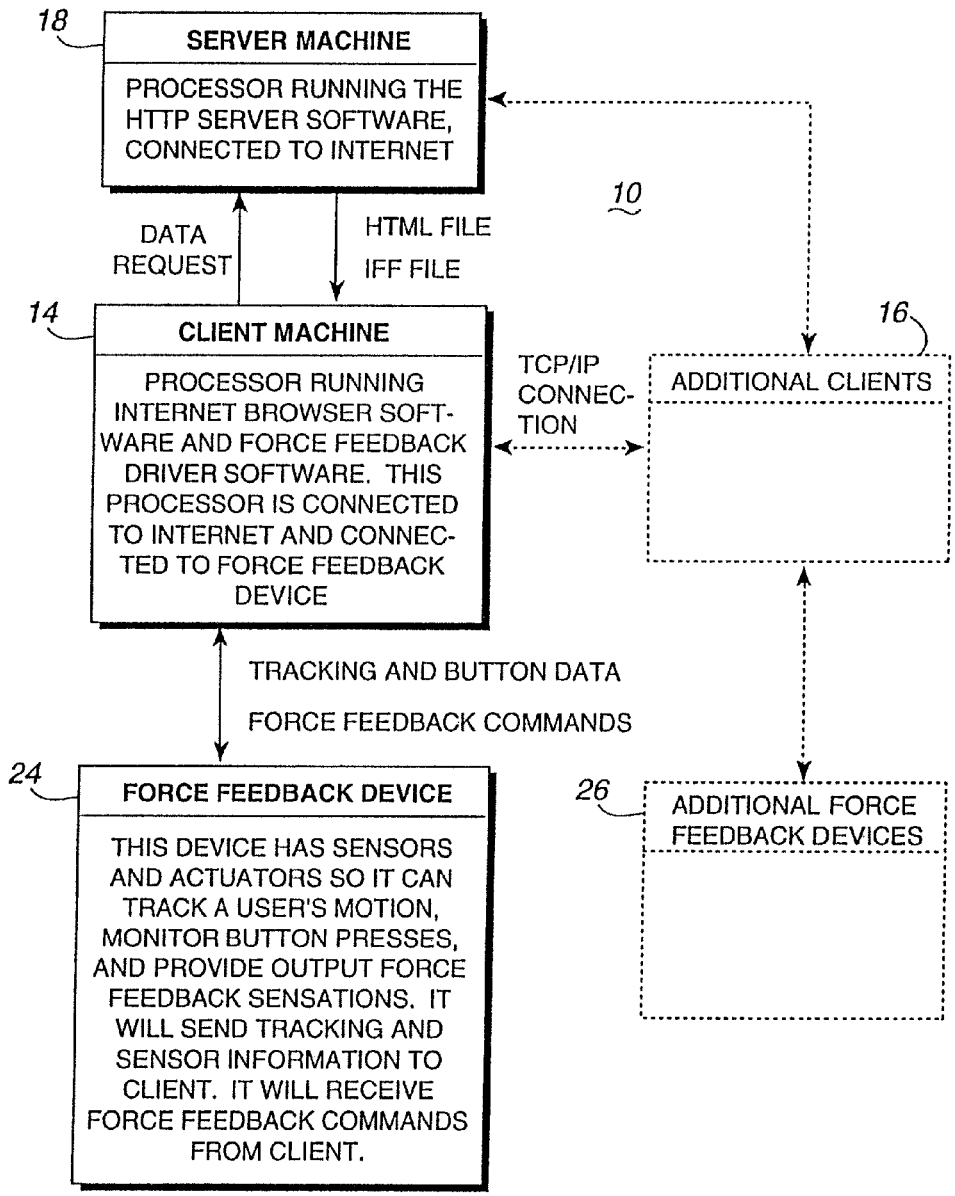
FIG. 6 is a block diagram of a wide area network (WAN) based upon Internet TCP/IP protocol and supporting World Wide Web (WWW) HTML protocols in accordance with the present invention.

In FIG. 6, a conceptual representation of the network system 10 with force feedback includes a server machine 18, a client machine 14 provided with a force feedback device 24, and one or more additional client machines 16, each of which may be provided with additional force feedback devices 26. As noted in this figure, the server machine is a computer or "processor" running, for example, the TCP/IP server software and is which is connected to the Internet. The client machine 14 includes a computer or "processor" running Internet browser software and force feedback driver software. The processor of the client machine is connected to the Internet and to the force feedback device 24. The force feedback device 24 has sensors and actuators so that it can track movement of the user manipulatable object, monitor for button presses and/or other ancillary input devices, and provide output force feedback sensations. The force feedback device 24 sends object tracking information to the client machine, and receives force feedback commands from the client machine 14. The "additional client", such as client machine 16, also includes computers or "processors" running Internet browser software and force feedback driver software. The processors of these additional clients are also connected to the Internet and are connected to force feedback devices associated with that client.

As noted in FIG. 6, a client machine 14 can send a data request to the server machine 18 and, in return, receive an HTML web page file including a special file of the present invention known as an "IFF" file. As will be appreciated by those skilled in the art, the server must also have a modified configuration file which lets it know that IFF is a valid MIME type. This modified file would be a SRM.CONF or other .CONF file. The client machine 14 then sends force feedback commands to the force feedback device 24 and receives tracking and button data from the force feedback device 24. Client machine 16 can likewise send a data request to the server machine 18 and receive an HTML file with one or more IFF files. The client machine 16 can then interact with the force feedback device 26 by sending force feedback commands to the device 26 and by receiving tracking and button data from the force feedback device 26.

In addition to communicating with the server machine, the client machines can communicate directly with each other over the Internet using an Internet communication protocol. For example, client machine 14 can communicate with client machine 16 through a TCP/IP connection. This is accomplished making the URL of the client machine 16 known to the client machine 14, and vice versa. In this fashion, direct communication between client machines can be accomplished without involving the server machine 18. These connections can send force feedback information and other information to the other client machine. For example, a process on the client machine 16 can send force feedback information over a TCP/IP Internet connection to the client machine 14, which will then generate a force feedback command to the force feedback device 24. When the user reacts to the force feedback at force feedback device 24, this information can be sent from client machine 14 to client machine 16 to provide force feedback to the user on force feedback device 26.

Figure 7A:
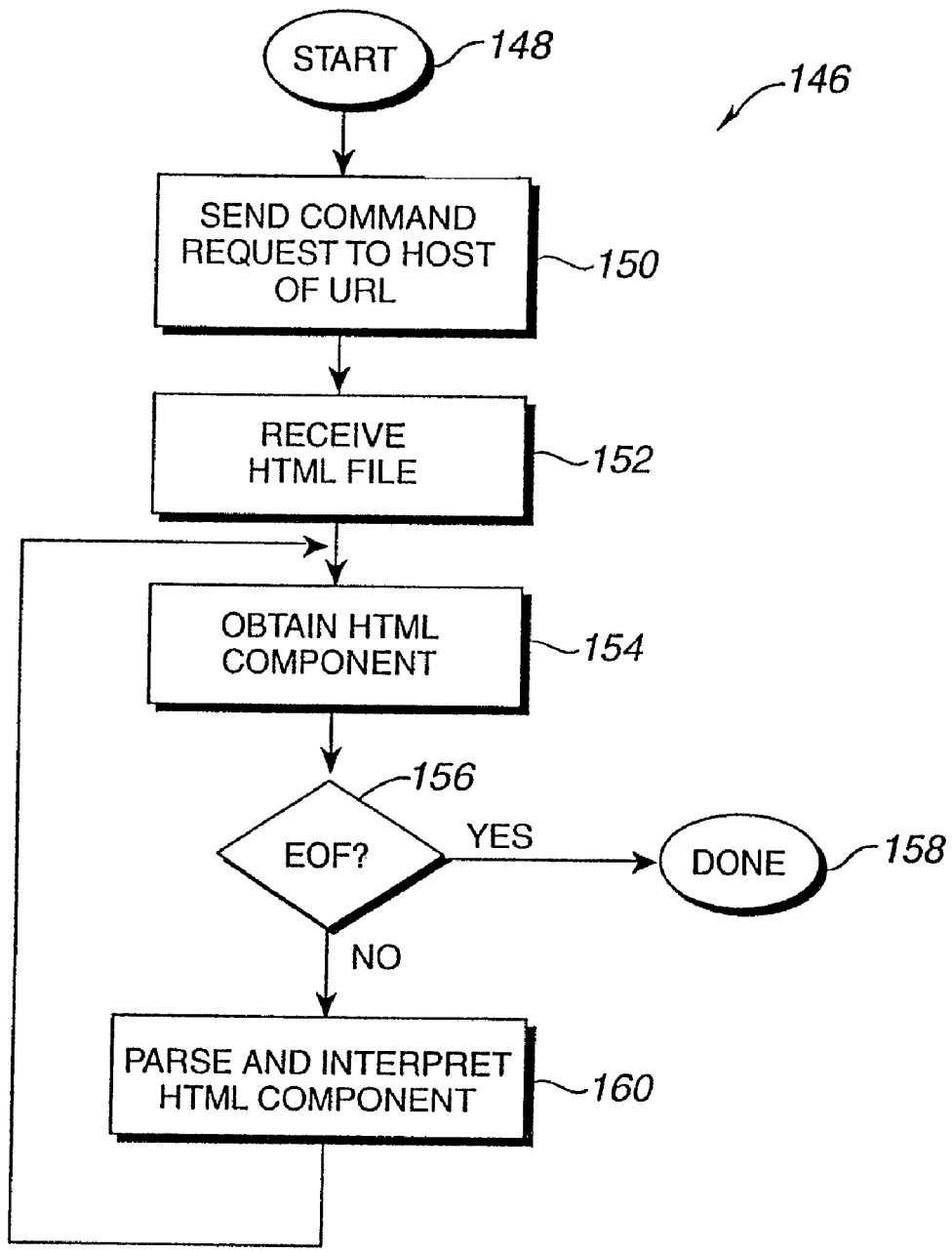
FIG. 7a is flow-diagram of a "Acquire URL" process in accordance with the present invention.

In FIG. 7a, a flow diagram illustrates an "acquire URL" process 146 running on a client machine, such as client machine 14 or client machine 16. This process is used when a client downloads a web page and force information from a server machine. This process 146 can be implemented using a standard Internet browser with a "plug-in" extension which permit the handling of force feedback commands. A preferred browser software is Netscape Navigator® software available from Netscape Corporation of Mountain View, Calif. The plug-in software is a proprietary extension of the web browser software, where this proprietary extension was developed by the Applicant of the present application.

The process 146 begins at 148 and, in a step 150, a connection request is sent to the "host" of the desired URL. The host, in this example, is a server machine 18 and the desired URL is the URL of the desired web page residing on the server machine 18, the web page including force feedback commands. Alternatively, the desired web page can reside on another server or resource and be retrieved by server machine 18. In response to the connection request of step 150, the server machine 18 sends the HTML file representing the web page over the Internet to be received by the client machine. The HTML file includes a number of "components" which are typically commands, command fragments, instructions, and data which permit the display of the web page and other web browser functionality. In a step 154, and an HTML component is obtained. If this component is the end of file ("eof"), a step 156 detects that fact and the process is completed at 158. Otherwise, the HTML component is parsed and interpreted at a step 160 and process control is returned at step 154. It should be noted that most web browser software will start parsing and interpreting (i.e. processing) the HTML components even before the entire HTML file is received at the client machine. Alternatively, the entire HTML file can be received before the processing begins.

In FIG. 7b, an example of an HTML web page 32, sent from a web server machine 18 to a client machine (such as client machine 14 or 16) over the Internet 12, is shown. The HTML file 32 includes a number of "components" which are parsed and interpreted as previously described. An HTML file begins with a <HTML> command 162 to indicate the start of the HTML file, and a <BODY> command 164 to indicate that the body of the HTML file is beginning Then, an arbitrary number of HTML commands 166 are provided to, for example, display images of the web page on the video display of the client machine. A <CENTER> command 168 will cause a centering of following objects with respect to the browser window on the video display of the client machine. Next, an <EMBED . . . > command 170 of the present invention defines a force button object that will be displayed on the client machine. Since the <CENTER> command 168 was given just prior to the <EMBED . . . > command, this "force button" will be centered in the displayed browser window. Other force objects besides button objects can also be defined and displayed, such as links, text, sliders, game objects (balls, paddles, etc.), avatars, windows, icons, menu bars, drop-down menus, or other objects.

In a first line 172 of the <EMBED . . . > command, the force button object is defined by a "IFF" extension file, namely "FORCEBUTTON.IFF." Next, in a line 174, the size of the button is indicated to be 100 pixels by 100 pixels. In a line 176, the initial state of the button is indicated to be "up" (i.e., unselected), and a line 178 defines the force effect to be "vibration." A number of parameters 180 defining the character and nature of the vibration are also provided (start time, length, frequency, magnitude, etc.). In a line 182, the "trigger" for the force effect is given by the function "MOUSEWITHIN" with its associated parameters, and by the function "BUTTONSTATE." The function MOUSEWITHIN determines whether the pointer, the position of which is controlled by the force feedback device, is within the specified boundaries defining a region of the force button. This region can be specified by the parameters and, for example, can be defined as the exact displayed area of the button, or can be defined as a sub-region within the button that is smaller than the displayed size of the button. The function BUTTONSTATE determines whether a button or switch of the force feedback device is in the desired state to trigger the force object event (e.g., a button event in this example). In a line 184, the icon representing the force button is specified as "LOUIS.GIF," and the text associated with the button is defined as "Hi, I'm Louis" in a line 186. The font of the text is given as "Helvetica" in a line 188. Other force effects, triggers and parameters can also be associated with the force object. For example, a force (such as a vibration) can be triggered if the pointing icon is moved a predetermined velocity or within a predefined range of velocities within the force object. Or, a trajectory of the pointing icon on a force object can trigger a force, like a circle gesture.

The <EMBED . . . > command is an existing functionality of HTML. It essentially embeds function calls which are handled by the web browser. If the suffix of the specified file is a known, standard suffix type, the call is executed directly by the web browser. If, however, the suffix (.IFF in this instance) is not a standard feature of the web browser, the browser will first look for a "plug-in" to implement this feature and, if a suitable plug-in is not found, it will look for application programs implementing this feature. In one embodiment, a plug-in including a reference to a Dynamically Linked Library (DLL) is provided to give functionality to the IFF suffix. The DLL can be provided local to the client machine or on another linked resource.

With continuing reference to FIG. 7b, the centering command is terminated at line 190 with the </CENTER> command. Additional HTML commands 192 can then be provided, and the body of the HTML file is terminated by the </BODY> command 194. The end of the HTML file is indicated at 196 with the </HTML> command, i.e. this command 196 is the "eof" command of the HTML file 32.

The present invention also provides for programmability of the embedded force feedback object. An example of this programmability is shown at 198. This optional programmable command can be inserted into the EMBED command 170 and can include, for example, an iterative loop. In line 200, a "FOR" command initializes a counter i to 0, indicates that the counter I is incremented by one per each pass through the loop, and it indicates that the loop should be completed five times, i.e. while i<5. The body of the loop includes a command line 202 which indicates that a force feedback "vibrate" with associated parameters should be evoked, and a line 204 indicates that a 5 second wait should be provided after the vibration has occurred. This step will repeat five times, i.e. the command 198 will cause five vibration sequences separated by four 5 second pauses, and followed by a final 5 second pause. By providing programmability to the force feedback object, force feedback effects based upon past events and upon a complex interaction of factors can be provided.

Figure 8:
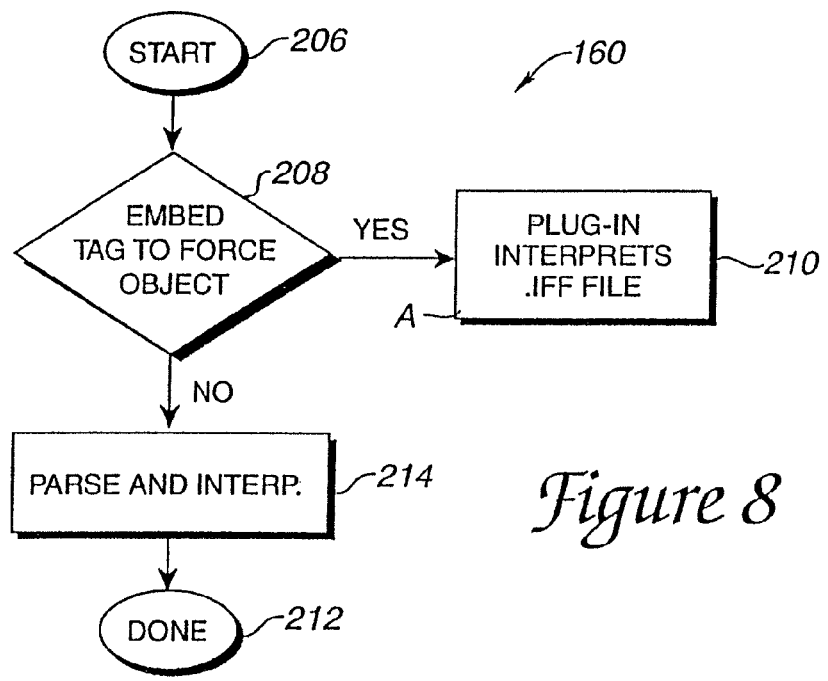

In FIG. 8, the "Parse And Interpret HTML Component" or simply "Process HTML Component" step 160 of FIG. 7a is illustrated in greater detail. In FIG. 8, process 160 begins at 206 and, in a step 208, it is determined whether there is an embedded "tag" for a force object, e.g. a tag having an IFF reference. An example of the embedded tag is shown at the EMBED command 170 of FIG. 7b. If there is such a tag, step 210 uses the plug-in software of the present invention to interpret the .IFF file, and the process is completed at 212. Otherwise, another type of HTML command has been encountered, and the standard web browser parser and interpreter processes this HTML component in a step 214, after which the process is completed at 212.

Figure 9:
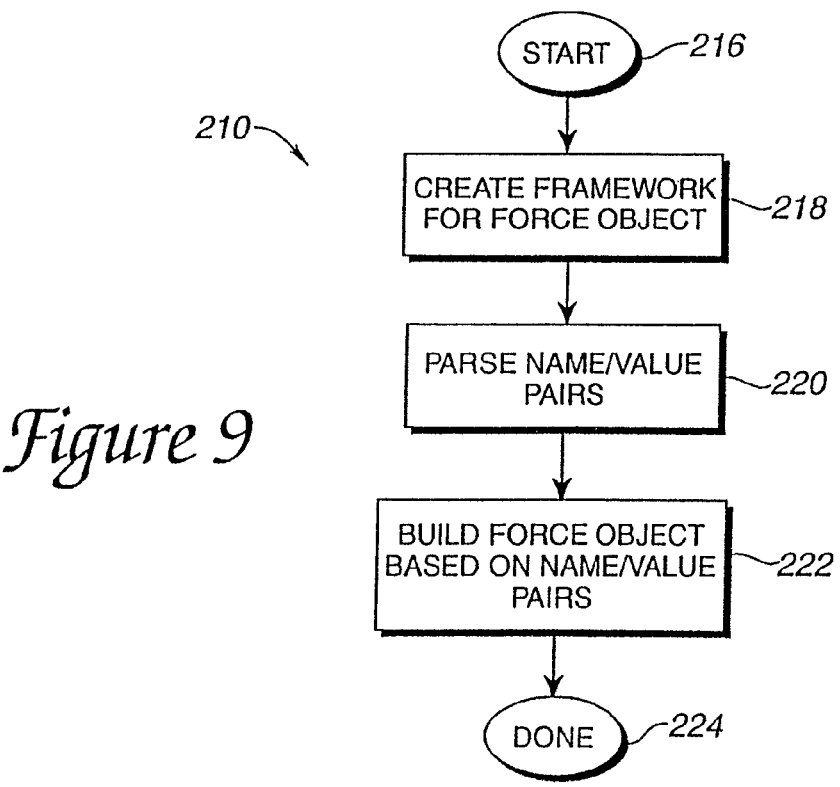
FIG. 9 is a flow-diagram of the "Plug-in Interpret .IFF File" step of FIG. 8.

In FIG. 9, the step 210 "Plug-In Interprets .IFF File" of FIG. 8 is described in greater detail. Process 210 begins at 216, and in a step 218, a "framework" is created for the force object. The framework provides a particular set of generic features to implement the specified force object, and preferably includes no specific parameters or functions for the force object. Next, in a step 220, the name/value pairs are parsed and, in a step 222, the force object is built upon this framework based upon the name/value pairs. A name/value pair includes the name of a component and its associated parameters. For example, one name might be "BUTTONSTATE" and its value (or parameter) might be "UP" (or "UNSELECTED"). The process 210 is completed at 224.

Figure 9A:
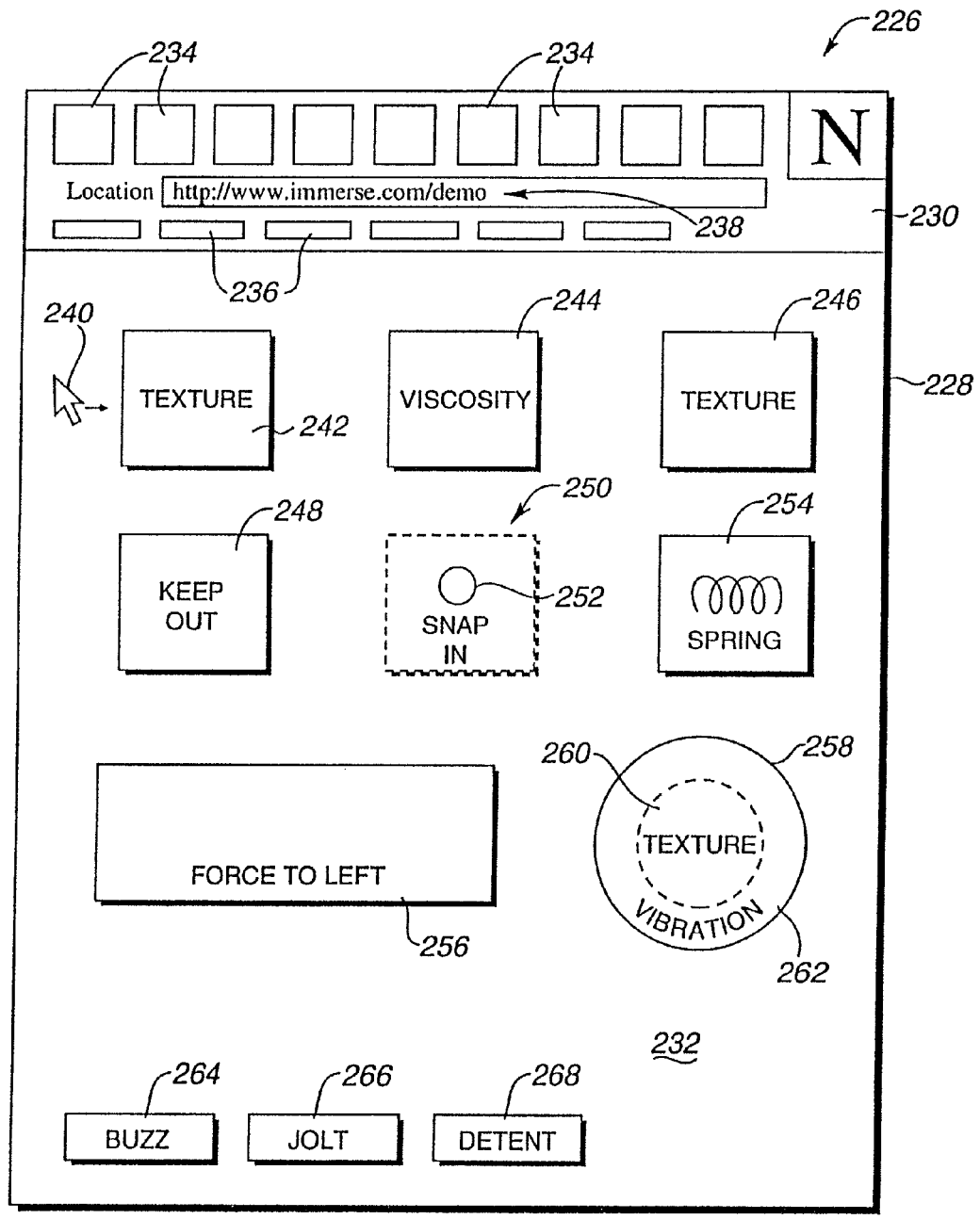
FIG. 9a is an illustration of an image displayed on a visual display of a client computer as generated from a downloaded HTML web page file.

In FIG. 9a, an image 226 to be displayed on a screen of a video monitor or other visual display is illustrated. More specifically, image 226 can be generated by the popular Netscape Navigator® web browser. The image 226 includes a window 228 including a header portion 230 and a body portion 232. The header portion 230 includes a number of navigation buttons 234 and special purpose buttons 236, for purposes well-known to those familiar with the Netscape Navigator web browser. In addition, the header portion 230 displays the URL of the currently displayed web page at 238. In this instance, the URL is "http://www.immerse.com/demo." The images displayed within the body portion 232 of the window 228 are created by the aforementioned processing of the HTML file by the web browser.

The area within the body portion 232 has been provided with a number of regions and buttons to illustrate some of the concepts of the present invention. The force feedback device controls the position of a pointer icon 240 which can be caused to interact with the various regions and buttons. As an example, when the force feedback device is manipulated by the user to cause the pointer icon 240 to move within a "texture" region 242, force feedback commands can be created for the force feedback device to provide a desired "texture" to the force feedback device. For example, the texture can feel "rough" to the user by causing the force feedback device to place forces on the user manipulatable object that emulate a rough or bumpy surface. In a region 244, a "viscosity" force feedback can be provided. With this form of force feedback, as the pointer icon is moved through field 244, a viscous "drag" force is emulated on the user manipulatable object. In a region 246, inertial forces can be felt. Therefore, a pointer icon being moved through an "inertia" region would require relatively little or no force to move in a straight line, but would require greater forces to accelerate in a new direction or to be stopped. The inertial force sensations can be applied to the user manipulatable object and felt by the user. In a "keep out" region 248, the pointer image is prevented from entering the region. This is accomplished by creating a repulsive force on the user manipulatable object using a force feedback command to the force feedback device which prevents or inhibits the user from moving the user manipulatable object in a direction of the region 248 when the pointer icon 240 contacts the periphery of the region 248. In contrast, a "snap-in" region 250 will pull a pointer icon 240 to a center 252 whenever the pointer icon engages the periphery of the snap-in region 250 and apply a corresponding attractive force on the user manipulatable object. A "spring" region 243 emulates a spring function such that a pointer icon moving into the spring region "compresses" a spring, which exerts a spring force on the user manipulatable object which opposes the movement of the pointer icon. A region 256 is a "Force To Left" region where the pointer icon within the region 256 is forced to the left side of the region and the user manipulatable object is forced in a corresponding direction as if influenced by some invisible magnetic force or gravitational force. A region 258 illustrates that regions can be of any size or shape and that within a region different force effects can be developed. In this example, within region 258 there is a texture core 260 surrounded by a vibration ring 262. Therefore, as the pointer icon 240 moves into the region 258, the user first experiences vibration from the ring 262, and then experiences a texture as the pointer icon moves within the core 260.

The exemplary force feedback web page of FIG. 9a is also provided with several force feedback buttons. In a first button 264, the placement of the pointer icon 240 over the button and the pressing of a button (i.e., a switch) on the force feedback device to create a "button click", "button down", or simply a "button event" input, will then cause a "buzz" command to be sent to the force feedback device. The buzz command would, for example, cause a vibration force on the user manipulatable object. Similarly, the selection of the "jolt" button 266 will cause a jolting force (e.g., a short-duration pulse of force) to be provided at the force feedback device, and the pressing of the "detent" button 268 will cause a "detent" to be created for the force feedback device. By "detent" it is meant that the user manipulatable object will be controlled by the force feedback actuators such that it feels as if a mechanical-type detent exists at the position that the user manipulatable object was in when the detent button 268 was activated.

These and other forces resulting from a pointing icon interacting with various objects displayed on a computer screen are also described in patent application Ser. No. 08/571,606 filed Dec. 13, 1995, Atty. Ref. IMM1P015, the disclosure of which is incorporated herein by reference.

Figure 10:
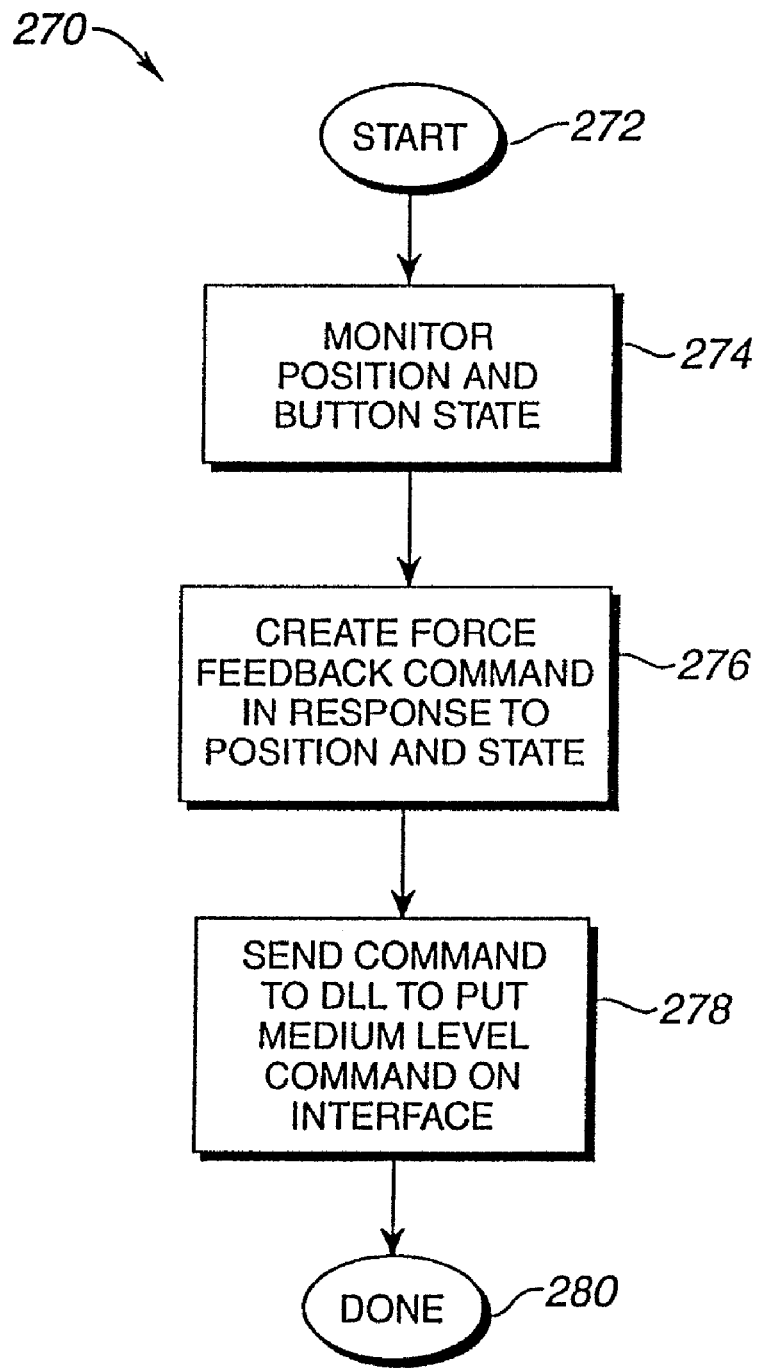
FIG. 10 is a flow-diagram of a process for monitoring the "pointer state" of the force feedback device of the present invention.

In FIG. 10, a process 270 of the plug-in software of the present invention is illustrated. The process 270 begins at 272 and, in a step 274, the position and button state of the force feedback device is monitored. Next, in a step 276, a force feedback command is created in response to the detected position and state. Finally, a command is sent to the Dynamically Linked Library (DLL) to place a force feedback command on the interface which can be parsed and interpreted by the force feedback device. The process is then completed as indicated at 280.

It should be noted that the force feedback driver (e.g., browser plug-in or DLL) can have the ability to interact with JAVA code. In this embodiment, the plug-in reads and executes JAVA commands using the browser's run-time JAVA interpreter. JAVA can optionally be used to make "applets" which perform dynamic models, such as creating complex force feedback sensations.

It should also be noted that the force feedback device itself can have a JAVA interpreting chip on board, permitting the plug-in driver to download JAVA code to the force feedback device to be executed on the device. JAVA and JAVA interpreting chips are available under license from SUN Microcomputers of Mountain View, Calif.

Furthermore, the force feedback driver (e.g., browser plug-in or DLL) can have the ability to interact with instructions provided in other languages besides HTML. For example, virtual reality 3-D graphical environments are increasingly being created and implemented over the World Wide Web and Internet using languages such as the Virtual Reality Modeling Language (VRML) and software such as Active X available from Microsoft Corporation. In these 3-D graphical environments, users may interact with programmed 3-D objects and constructs using client computer 14 or 16, and may also interact with 3-D graphical representations (or "avatars") controlled by other users over the World Wide Web/Internet from other client computers. Force feedback commands and parameters can be provided in the instructions or files of these other protocols and languages and received by a client computer system in an equivalent manner to that described above so that force feedback can be experienced in simulated 3-D space. For example, embedded force feedback routines can be included in the VRML data for a virtual environment so that when the user moves into a virtual wall, an obstruction force is generated on the user-manipulatable object. Or, when the user carries a virtual object in a controlled virtual glove, the user might feel a simulated weight of the virtual object on the user manipulatable object. In such an embodiment, the force feedback device preferably provides the user with three or more degrees of freedom of movement so that input in three dimensions can be provided to the client computer.

Figure 11:
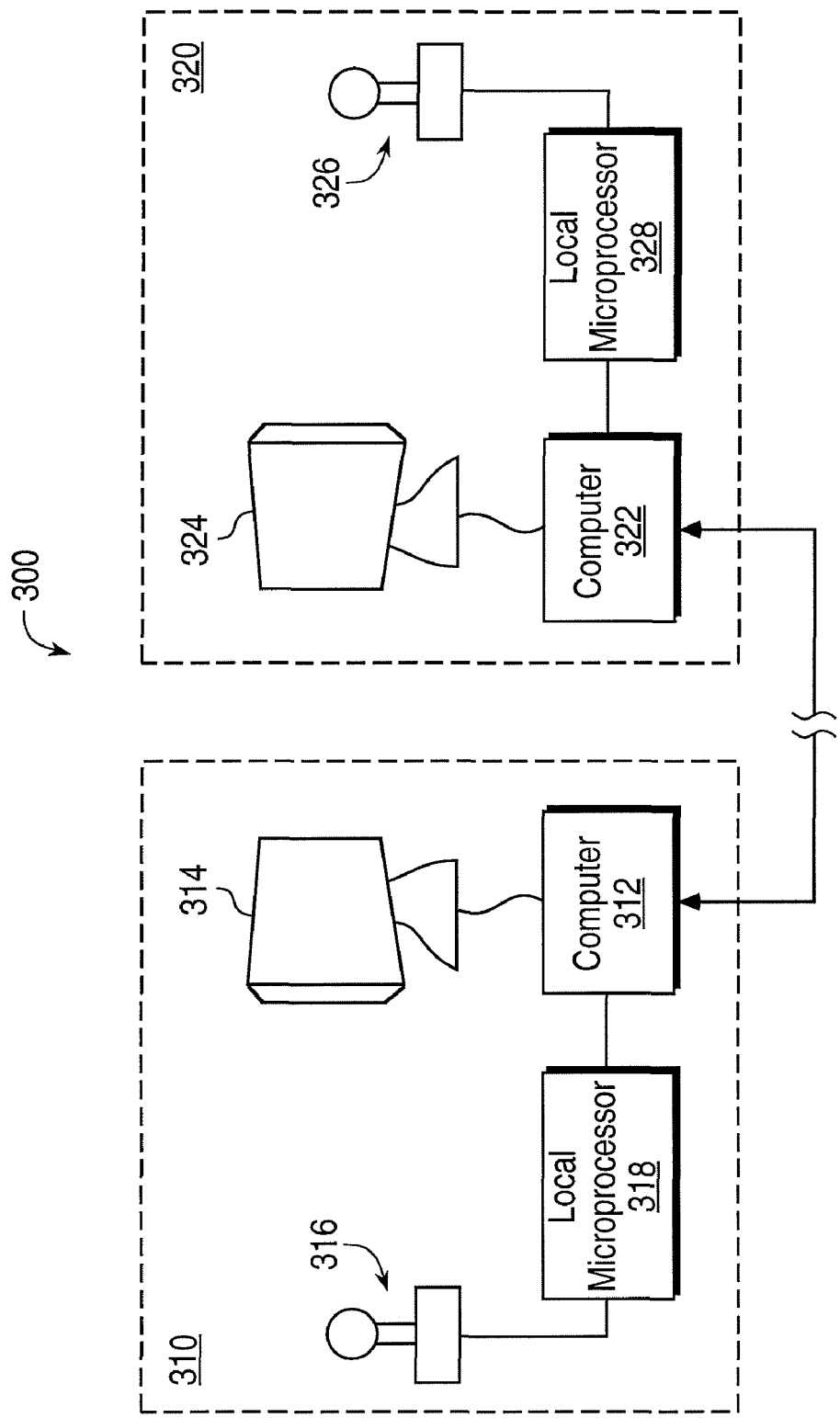
FIG. 11 is a schematic diagram of a multi-computer network system used in accordance with client-to-client embodiments.

FIG. 11 is a schematic diagram of a multi-computer network system 300 which can be used in accordance with peer-to-peer (client-to-client) embodiments disclosed herein. Force feedback implementation over networks can be based on displayed interactions and client-to-client direct communication of force feedback information. Two or more host computer applications or graphical environments can be linked over a computer network to provide multi-user interactions involving two, three or more users. The same application programs can be running on each of the linked host computers, or different application programs can be linked. For example, different types of web browsers, each able to parse and communicate in TCP/IP protocols, can communicate with each other and display graphical objects based on position information received from the other computers. Forces can be output based on both information from a local force feedback device and application program, as well as information received from other host computers over the network. A bi-directional networked interface allows users at different connected host computers to interact in visual, auditory, and haptic ways.

In one embodiment, a first site 310 includes computer 312 that implements a graphical environment, such as a web browser, simulation, or game application, and a first user utilizes display device 314 and force feedback interface device 316. Optionally, local microprocessor 318 is coupled to interface device 316 as described with reference to FIG. 3. At a second site 320, computer 322 implements the graphical environment, display device 324 displays images to a second user, force feedback interface device 326 interacts with the second user, and local microprocessor 328 can optionally be included. The first site is a "remote" site with reference to the second site, and vice versa. Each computer 312 and 322 implements a local application program so that each display device 314 and 324 displays a local visual environment, such as a web page, a video game, or a simulation. Additional users and computers that implement the graphical environment can be included in the network system 300 similarly to the systems described. In some embodiments, a graphical environment need not be displayed or is not updated, and forces are output to a user based on motion of the user manipulatable objects of the force feedback devices of the connected computers. The computers 312 and 322 are connected by a computer network, which can be the Internet or other form of network that allows bi-directional transmission of information.

Each local computer 312 and 322 has direct access to its own interface device 316 and 326, respectively, but does not have direct access to the remote interface device used by the other user. Thus, the information which describes the position, orientation, other motion or state characteristics, button data, and other information related to each local interface device (collectively considered "motion/state information" herein) is conveyed to the other remote computer. Each local computer 312 and 322 therefore has direct access to the local interface device and networked access to the motion/state information of the remote interface device, allowing a consistent interaction for both users.

The computers 312 and 322 need only exchange the information that is necessary to update the simulated graphical objects controlled by the remote users and other simulated characteristics that may have been affected by the input of a user. This minimal information exchange is often necessary when using networks having low or limited bandwidth and which have a slow rate of information transfer, such as many current connections to the Internet/World Wide Web, often implemented (for many home computer users) using low bandwidth telephone connections and relatively low-bandwidth modems or similar telecommunication devices. The computationally-intensive force feedback calculations to implement the interactions between a user-controlled object (e.g. cursor or paddle) and other objects (e.g., icons, GUI elements, other paddle) are preferably handled locally. The resulting outcome of the force feedback calculations/interactions are transmitted to remote users so as to minimize the information that is transmitted to other computer systems.

One type of information which is sent between the networked computers is motion/location/state information. For example, in a multi-user game interaction, when a local user controls one paddle and a remote user controls a different paddle, the position of the remote user's manipulandum is needed to determine paddle interaction and appropriate forces. Or, if a moving graphical object interacts with a paddle controlled by a local user, the local computer processes the interaction, generates the required local force feedback sensations, computes the new location and velocity of the moving graphical object as a result of the interaction, and conveys the new graphical information to the remote computer(s) so that all game applications can be re-coordinated after the object interaction. The remote computer then computes any force feedback sensations occurring at its own site resulting from the new object position, motion, etc.

When using a network having low- or limited-bandwidth, there may still be a substantial time delay from when a local graphical object, such as a cursor or paddle, changes its location/motion/state information and when the remote web browsers or application programs receive and are updated with that information. Thus, a user at a given site may be viewing a remote-user-controlled graphical object at a time delay while viewing his own cursor in real time without a time delay. For example, the user may witness a cursor-icon interaction a few seconds after the actual event happened on the remote user's local implementation of the interaction. Obviously, this can cause problems in the experience of networked interactions and game play. To compensate for this problem, a networked graphical environment may introduce a short time delay before events occur locally. For example, a short delay can be implemented on the local computer before a ball bounces off of a paddle to reduce the timing discontinuity between remote and local users.

In addition, force feedback or "feel sensation information" can be transferred from one host computer to another over the network. This type of information can be provided, for example, if a force should be output that is not based on position or motion of the user manipulatable objects or interacting graphical objects. Thus, if a button press on a joystick manipulandum of force feedback device 316 designates that a vibration is to be output on the other joystick manipulandum of force feedback device 326, a force feedback command or other similar information can be sent from computer 312 to computer 322, preferably including parameters describing the vibration feel sensation. Computer 322 parses and interprets the command and then commands the force feedback device 326 to output the vibration on the joystick of device 326. Such commands and parameters can be implemented similarly to the HTML or VRML embodiments described above, or in a different format. The computer 322 thus receives the feel sensation information directly from the other computer 312. Alternatively, the computer 312 can simply send the button press information, so that the computer 322 interprets the button press as a particular force sensation and outputs that sensation. However, with such an embodiment, the computer 322 would need mapping information that indicates which feel sensation corresponds to the received button press, and this mapping information has to be updated periodically so as to provide synchronization. If force feedback information is sent directly, there is no need for the computer 322 and/or force feedback device 326 to store data mapping a particular button press to a feel sensation, saving memory and synchronization steps. Such feel sensation information can also be useful to characterize graphical objects in a game or simulation which one computer generates or updates and needs to convey to any other linked computers to provide synchronization. For example, a wall graphical object can be characterized as having a hard or soft surface, having a smooth or frictional surface, and having other force characteristics.

The force feedback command or other information relayed from a host computer to its force feedback device can be determined based on the motion/state information and/or force feedback information received over the network. In many cases, the force feedback command or other information can be also based on input from the local force feedback device. For example, a force need not be commanded until a controlled graphical object impacts a different graphical object. To determine whether the user-controlled graphical object has impacted another object, position (or other motion) information is received from the local force feedback device which indicates the current position of the user object in its degrees of freedom. From this information, a new position of the user-controlled graphical object is determined, and any interactions of this object with other objects are realized.

Many different applications of force feedback implementation over networks in a client-to-client configuration can be implemented. For example, two graphical objects, each controlled by a different user, can interact and the users can experience forces based on the interaction. In one implementation, a first computer displays a first user controlled graphical object that is moved in conjunction with the first user's manipulation of a first force feedback device connected to the first computer. The first computer also displays a second graphical object. The second computer, connected to the first computer by a network, also displays the first and second graphical objects on a display screen of a second host computer. The second graphical object is moved in conjunction with the second user's manipulation of a second force feedback device connected to the second computer. Force feedback can be provided to both first and second computers based on the interaction of the first and second object.

Figure 12A:
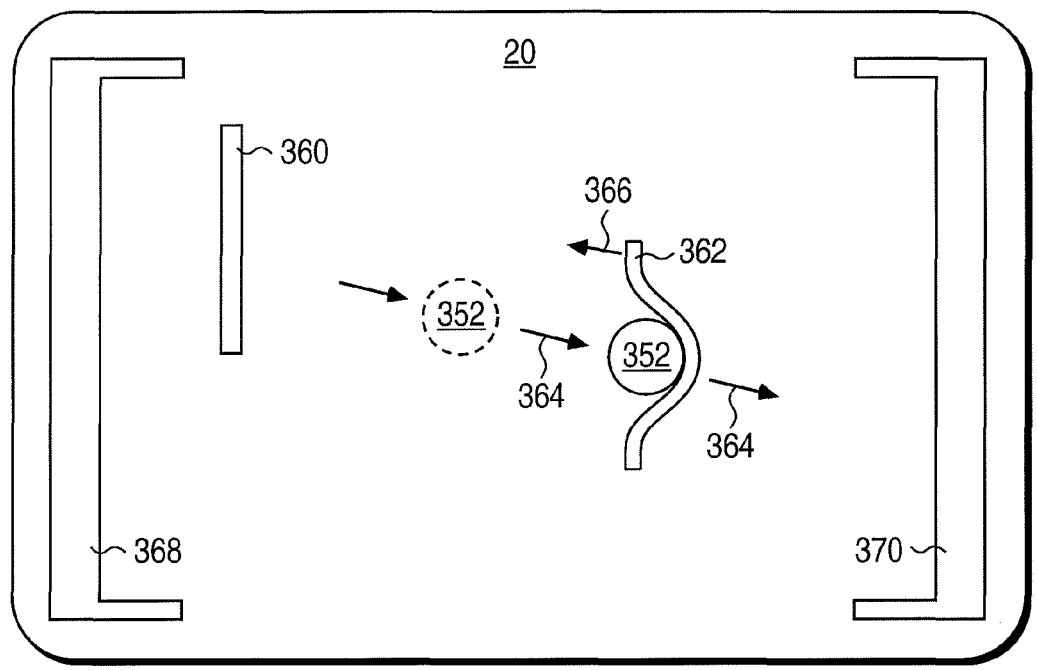
FIGS. 12a and 12b are diagrammatic illustrations of a client-to-client game embodiment displayed on a display screen of a client computer.
Figure 12B:
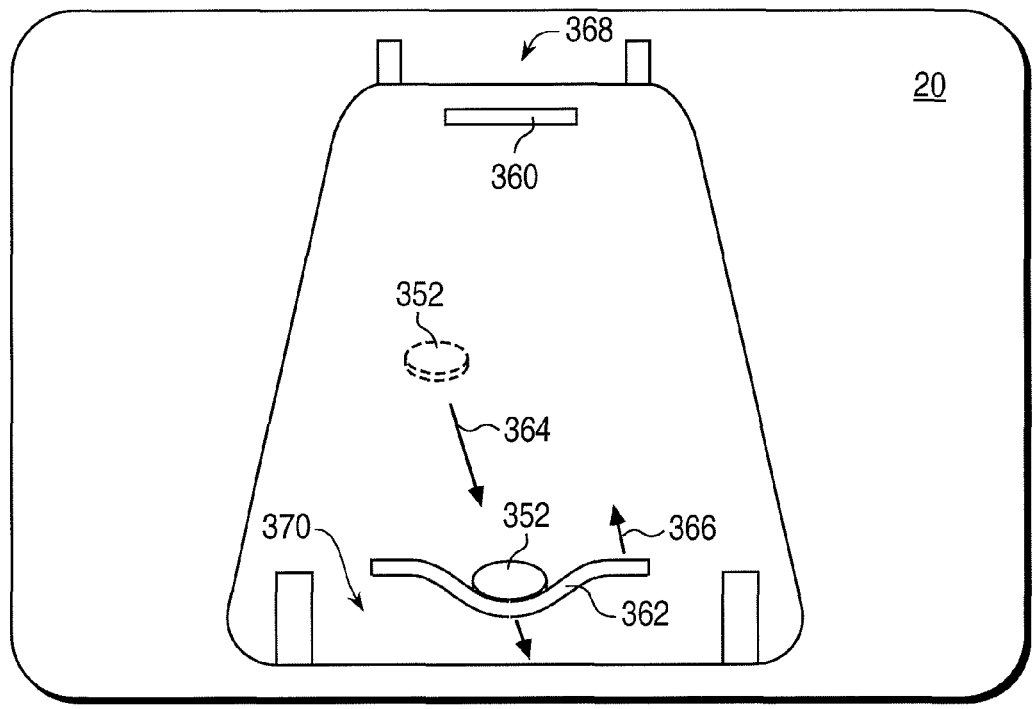

One example of using client-to-client interaction in a game is shown in FIG. 12a. A 2-D implementation of displayed graphical objects on display device 64 is shown. Paddle 360 can be controlled by a first host computer system, such as client machine 14, and paddle 362 can be controlled by a second host computer system, such as client machine 16. Ball 352 can be moved on display screen 64 according to simulated physical parameters, such as velocity, acceleration, gravity, compliance of objects, and other parameters as discussed previously. When the ball 352 collides with paddle 362, the paddle flexes, and the user feels the collision force. For example, if ball 352 is moving in direction 364, then the user feels a force in the equivalent degrees of freedom of user object 76. In some embodiments, both the paddle 362 and the ball 364 can be moved in direction 364 to simulate the paddle being pushed back by the ball. FIG. 12b shows a similar embodiment in which a perspective view (or simulated 3-D view) of the graphical objects is shown on display screen 20.

The user can also move the user object so that the paddle moves in a direction 366. The user will thus feel like he or she is "carrying" the weight of the ball, as in a sling. The ball will then be released from the paddle and move toward the other paddle 360. As is well known, a goal in such a game might be to direct the ball into the opposing goal. Thus, the first user can try to direct the ball into goal 368, and the second user can control paddle 360 to direct the ball into goal 370. Paddles 360 and 362 are used to block the ball from moving into the defended goal and to direct the ball back at the desired goal. By moving the paddle in a combination of direction 366 and up and down movement, the user can influence the movement of the ball to a fine degree, thus allowing a player's skill to influence game results to a greater degree than in previous games without force feedback. In addition, other features can be included to further influence the ball's direction and the forces felt by the user. For example, the orientation of the paddle can be changed by rotating the paddle about a center point of the paddle, and force feedback can be appropriately applied in that degree of freedom. Other features can also be provided, such as allowing a ball to "stick" to a paddle when the two objects collide and/or when a button is pressed by the user. The user could then activate the button, for example, to release the ball at a desired time.

Each player can feel the forces on their respective paddle from the ball directed by the other player. In addition, if the two paddles 360 and 362 were brought into contact with one another, each player can feel the direct force of the other player on each player's user object. That is, the first user's force on his user object causes his paddle 362 to move into the other paddle 360, which would cause both the first and second users to feel the collision force. If the first paddle 362 were allowed to push the other paddle 360 across the screen, then the second user would feel the first user's pushing force. The first user would feel similar forces from the second user.

In a "tug of war" game example, the first and second graphical objects (such as two paddles or other objects) can be visually connected. When the first user controls the first graphical object to move left, this position information is transferred to the second computer, and the second user controlling the second graphical object feels a force in a left direction resulting from the first player's manipulation. A similar result occurs for the first player when the second player manipulates the second graphical object. This creates the effect as if each player were pushing the other player directly. Furthermore, force information ("feel sensation information") can also be transmitted between computers. For example, if a flexible "rope" is modelled connecting the first and second graphical objects, and the first user manipulates the first force feedback device so that the rope is made to oscillate or vibrate, then the first computer can send feel sensation information to the second computer that informs the second computer to command a vibration feel sensation on the second force feedback device, with appropriate parameters describing the vibration such as frequency, amplitude, and duration. The second user thus immediately feels appropriate forces caused by the first user. The winner of the tug-of-war can be the first user to move his or her graphical object to a specific goal or displayed location in opposition to forces from the other player and/or other obstacles. Alternatively, a user can be designated to win the tug-of-war or other game if that user can maintain a particular position of the user manipulatable object amid the forces output based on the interaction of the graphical objects and caused by both users.

A different example of a client-to-client communication of force feedback information can take the form of a "massage" interface. Two users, for example, can interact with each other by each feeling the presence of the other in an "intimate" way through the use of forces influenced by the device manipulation of the other user. The "input" of the user at one client computer is felt as "output" by the user at the other client computer, and vice-versa, much like the tug-of-war example above. Referring to FIG. 1, a first user can be interfaced to a network, such as the Internet, through client machine 14 using a force feedback massage interface. A second user can be interfaced to the network through client machine 16, also using a force feedback massage interface. For example, the interface can include a user manipulatable object that is a representative body part such as a hand, foot, sexual organ, etc. (moveable in one or more degrees of freedom). The first massage interface can apply conditions, effects, or other force sensations to the first user, depending upon the feel sensation information sent from the second client machine. For example, the first user can press a button that causes the first client to send a vibration command to the second client and second user via the network connection. The first user or first client can specify the magnitude, frequency, wave shape, and/or the direction of the vibration sensation. In addition, the force feedback massage interface of the first user can receive information that is generated in part by the force feedback massage interface of the second user. For example, client machine 14 can automatically determine that feel sensation parameters (magnitude, direction, frequency, etc.) are sent by interpreting the positional input that the first user generates using the first force feedback device. Thus, transferring physical information back and forth allows the first and second users to interact with each other through the network. The physical sensations are exchanged by performing two steps: identifying a client (e.g., by URL) and sending feel sensation information that can be interpreted by that client and displayed/output on the force feedback interface device.

In a simple application of such an embodiment, the first user can massage the back of the second user by linking the first force feedback device connected to the first client machine with the second force feedback device connected to the second client machine. A user manipulatable object of the first force feedback device can be grasped or otherwise physically contacted by the hand of the first user, tracking the motion of the user's hand and outputting forces to the user's hand. The second force feedback device can have a user manipulatable object shaped like a hand that can engage the back of the second user. The motion of the user object of the first force feedback device can be linked to the motion of the hand object of the second force feedback device such that when the first user moves his or her hand, the hand object connected to the second client machine moves around and engages the back of the second user. Using this embodiment, the first user can massage the back of the second user, where the second user feels the hand object with a motion and pressure dependent on the first user's input. The first user also receives force feedback from the interaction of the hand object with the back of the second user, where the pressure and motion from the second user's back applied to the hand object is relayed to the user object held by the first user. Thus, if the second user leans back and applies force on the band object, the first user feels that force.

In addition to the feel sensation information sent between the first client and the second client, other sensory information can be sent and displayed. For example, audio and video information can be transferred between the client computers. For example, both client computers can be connected to video cameras and microphones. The data from the video and microphone used by the first user can be sent to and displayed to the second user via a display device, such as a video screen, and via an audio output device, such as speakers; and the data from the second user can likewise be displayed to the first user. These other modalities can complete an environment that allows two or more users to interact through sight, sound, and touch.

In one embodiment of a client-to-client interaction, the force feedback device used by the first user can be linked to the force feedback device used by the second user such that the motion of the two user manipulatable objects are desired to be synchronized. If either user pushes his or her device such that it diverges from synchronization, a restoring force such as a spring force, for example, can be applied in the direction of the diverging device (or the non-diverging device, or both devices, as desired) needed to restore synchronization. The restoring force is applied as long as the two user manipulatable objects are out of synchronization. To determine if the user objects are in synchronization, the positions of the two user objects can be compared, where the position of each remote manipulandum is sent across the network to the other client to allow the comparison. For example, if the two positions maintain a constant relative distance between them within a predefined threshold distance, then no restoring force need be applied. If graphical objects are displayed based on the two user object positions, the graphical objects in some embodiments can be maintained in visual synchronization even though the user manipulatable objects are no longer in actual positional synchronization (if such visual synchronization is desired).

Many types of feel sensations can be sent across the network and combined in various ways. For example, a constant force or a spring force can be commanded to be applied to the force feedback interface device over the network, and other feel sensations/forces such as vibrations sensations can also be commanded over the network to be simultaneously overlaid on the constant or spring force. For example, the first user can press a button that causes the force feedback massage interface of the second user to output a vibration sensation over any forces already being experienced. A user can design a feel sensation using a feel sensation editor, such as shown in patent application Ser. Nos. 08/846,011 and 08/877,114, both assigned to the assignee of the present application and incorporated herein by reference. This allows the users to design, for example, a massage vibration sensation—including magnitude, direction, envelope, waveform, and to send the created sensation to a different user's site to be experienced by the user or used in that user's own force sensations. In addition, it should be noted that a single client can be interfaced to multiple clients such that a force sensation sent from one client is received by many clients over the network.

The first and second client computers can also be directly connected though a phone line or other transmission medium. The client computers can be networked through a direct TCP/IP connection or other LAN connection, or can be connected through the Internet as described above. For example, both client computers can be connected to the same server that provides a web page or other information to the clients. Information can be provided from one client to the server, then from the server to the desired client computer (or, a server can perform processing on data before it is sent to the receiving client computer). Alternatively, the clients can be connected directly over the Internet with data provided directly between clients (or as directly as possible over the distributed Internet), which tends to reduce the time delay of transmission. The clients need not send visual page information or feel sensation information to each other unless the interaction of one user causes the visual display to change on the other user's visual display.

In yet another embodiment, the peer-to-peer embodiments described above can also include communications with a server machine 18, such as shown in FIG. 1. For example, before sending feel sensation information from a first client to a second client, the first client can access at least part of the feel sensation information from the server machine 18. If, for example, server machine 18 provides a web page for access, the first client can download the web page when the server is accessed and the user can select a particular feel sensation displayed on the web page to be downloaded to download the feel sensation to the first client, or a feel sensation can be automatically downloaded upon establishment of a client-server connection. Alternatively, feel sensation information such as the commands and parameters disclosed above can be sent to the first client embedded in the web page. When the user of the first client commands that the feel sensation be output (such as by pressing a button, etc.), then the first client can transfer the feel sensation information to the second client to be output by the force feedback device of the second client. Alternatively, the server computer can send the feel sensation information (e.g., which may have been selected by the first client) directly to the second client if such a connection has been established. In one embodiment, the feel sensation information can be embedded in an HTML file as described in above embodiments, or the feel sensation information can be provided on its own in a similar format to the embedded reference disclosed above (i.e. a force object can be created locally from commands, parameters, or other references received by a client). The feel sensation information can also be provided in other formats.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

That which is claimed is:

1. A networked haptic feedback gaming system comprising:
   a first computer having a network interface for communicating with a second computer over a network, the first computer configured to:
     generate a first image in a first gaming environment on the visual display, the first image based on second information received from a second computer, the second information comprising second force information,
     transmit the first image to a first display;
     generate a first force feedback signal based at least in part on the second force information received from the second computer;
     transmit the first force feedback signal to a first actuator configured to output a first force effect based on the first force feedback signal,
     generate first information, the first information comprising first force information,
     transmit the first information to the second computer; and
   wherein the second computer is configured to:
     generate a second image in a second gaming environment on the visual display, the second image based on the first information received from the first computer,
     transmit the second image to a second display;
     generate a second force feedback signal based at least in part on the first force information received from the first computer; and
     transmit the second force feedback signal to a second actuator configured to output a second force effect based on the second force feedback signal.

2. The system of claim 1, wherein the first computer is in communication with a first manipulandum comprising the first actuator configured to output the first haptic effect.

3. The system of claim 2, wherein the first manipulandum comprises a local processor configured to:
   receive the first force feedback signal and to generate a first actuator signal based on the first force feedback signal; and
   transmit the first actuator signal to the first actuator to cause the first actuator to output the first force effect.

4. The system of claim 1, wherein the first force effect is correlated with the first image.

5. The system of claim 1, wherein the first computer is configured to communicate with the second computer in a peer-to-peer mode.

6. The system of claim 1, wherein the second haptic information comprises mapping information indicating a feel sensation.

7. The system of claim 6, wherein the first computer is further configured to request server force information over the network from a server, receive the server force information, and to generate the first force feedback signal based on the server force information.

8. A method comprising:
   sending a first force signal from a first computer to a second computer, the first force signal configured to cause a first force feedback signal to be sent to a second force feedback device from the second computer, wherein the first force feedback signal is configured to cause the second force feedback device to output a first force using an actuator of the second force feedback device;
   receiving second information from the second computer, the second information comprising second force information;
   generating a second force feedback signal based on the second force information, the second force feedback signal configured to cause the first force feedback device to output a second force using an actuator of the first force feedback device;
   transmitting the second force feedback signal to a first force feedback device in communication with the first computer; and
   displaying an image based on the second information.

9. The method of claim 8, wherein outputting the second force is correlated with first image.

10. The method of claim 8, wherein the first computer is configured to communicate with the second computer in a peer-to-peer mode.

11. The method of claim 8, wherein the second force information comprises mapping information indicating a feel sensation.

12. The method of claim 11, further comprising
requesting server force information from a server,
receiving the server force information, and
generating the first force feedback signal based on the server haptic information.

13. A memory comprising program code, the program code comprising:
program code for sending a first force signal from a first computer to a second computer, the first force signal configured to cause a first force feedback signal to be sent to a second force feedback device from the second computer, wherein the first force feedback signal is configured to cause the second force feedback device to output a first force using an actuator of the second force feedback device;
program code for receiving second information from the second computer, the second information comprising second force information;
program code for generating a second force feedback signal based on the second force information, the second force feedback signal configured to cause the first force feedback device to output a second force using an actuator of the first force feedback device;
program code for transmitting the second force feedback signal to a first force feedback device in communication with the first computer; and
program code for displaying an image based on the second information.

14. The memory of claim 13, wherein outputting the second force is correlated with first image.

15. The memory of claim 13, wherein the first computer is configured to communicate with the second computer in a peer-to-peer mode.

16. The method of claim 13, wherein the second force information comprises mapping information indicating a feel sensation.

17. The memory of claim 13, further comprising
program code for requesting server force information from a server,
program code for receiving the server force information, and
program code for generating the first force feedback signal based on the server force information.

* * * * *